(12) United States Patent
Abrams

(10) Patent No.: US 8,354,050 B2
(45) Date of Patent: Jan. 15, 2013

(54) CO-MOLDED DIRECT FLOCK AND FLOCK TRANSFER AND METHODS OF MAKING SAME

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 19 days.

(21) Appl. No.: 12/013,996

(22) Filed: Jan. 14, 2008

(65) Prior Publication Data

US 2008/0150186 A1    Jun. 26, 2008

Related U.S. Application Data

(60) Division of application No. 10/394,357, filed on Mar. 21, 2003, now Pat. No. 7,338,697, which is a continuation-in-part of application No. 09/629,746, filed on Jul. 31, 2000, now Pat. No. 6,929,771, and a continuation-in-part of application No. 09/621,830, filed on Jul. 24, 2000, now Pat. No. 7,344,769.

(60) Provisional application No. 60/366,580, filed on Mar. 21, 2002, provisional application No. 60/393,362, filed on Jul. 3, 2002, provisional application No. 60/416,098, filed on Oct. 4, 2002, provisional application No. 60/443,986, filed on Jan. 30, 2003.

(51) Int. Cl.
*B29C 45/14* (2006.01)

(52) U.S. Cl. ........ 264/275; 264/511; 264/135; 264/243; 264/247; 264/250; 264/257

(58) Field of Classification Search ........................ None
See application file for complete search history.

(56) References Cited

U.S. PATENT DOCUMENTS

| | | | |
|---|---|---|---|
| 1,580,717 A | 4/1926 | Flick |
| 1,905,989 A | 4/1933 | Safir et al. |
| 1,905,999 A | 4/1933 | Ellis |
| 1,975,542 A | 10/1934 | Forsdale |
| 1,992,676 A | 2/1935 | Schwarz |
| 2,047,978 A | 7/1936 | Maclaurin |
| 2,230,654 A | 2/1941 | Plunkett |
| 2,275,617 A | 3/1942 | Duerr et al. |
| 2,278,227 A | 3/1942 | Thackeray et al. |
| 2,477,912 A | 8/1949 | Vallandigham |
| 2,592,602 A | 4/1952 | Saks |
| 2,636,837 A | 4/1953 | Summers |

(Continued)

FOREIGN PATENT DOCUMENTS

CA    757595    4/1967

(Continued)

OTHER PUBLICATIONS

Official Action for European Patent Application No. 01955942.6, mailed Aug. 25, 2009.

(Continued)

*Primary Examiner* — Edmund H. Lee
(74) *Attorney, Agent, or Firm* — Sheridan Ross P.C.

(57) ABSTRACT

A method of decorating a molded article is provided that includes the steps of:
(a) providing a mold insert comprising a plurality of flock fibers and a permanent adhesive layer;
(b) positioning the mold insert in a mold; and
(c) introducing resin into the mold, such that a resin contacts the mold insert to form a molded article. The melting point of the permanent adhesive layer is preferably greater than a temperature of the resin during molding.

51 Claims, 13 Drawing Sheets

U.S. PATENT DOCUMENTS

| | | |
|---|---|---|
| 2,835,576 A | 5/1958 | Ensink |
| 2,981,588 A | 4/1961 | Hyman |
| 2,999,763 A | 9/1961 | Sommer |
| 3,099,514 A | 7/1963 | Haber |
| 3,215,584 A | 11/1965 | McConnell et al. |
| 3,314,845 A | 4/1967 | Perri |
| 3,351,479 A | 11/1967 | Fairchild |
| 3,377,232 A | 4/1968 | Mencock et al. |
| 3,411,156 A | 11/1968 | Feher |
| 3,432,446 A | 3/1969 | Coppeta |
| 3,459,579 A | 8/1969 | Newman |
| 3,496,054 A | 2/1970 | Baigas |
| 3,529,986 A | 9/1970 | Kappas et al. |
| 3,565,742 A | 2/1971 | Stephens et al. |
| 3,591,401 A | 7/1971 | Snyder et al. |
| 3,622,434 A | 11/1971 | Newman |
| 3,639,149 A | 2/1972 | Spalding |
| 3,657,060 A | 4/1972 | Haigh |
| 3,660,200 A | 5/1972 | Anderson et al. |
| 3,674,611 A | 7/1972 | Petry et al. |
| 3,772,132 A | 11/1973 | Dulin, Jr. |
| 3,775,205 A | 11/1973 | Hermann et al. |
| 3,793,050 A | 2/1974 | Mumpower, Jr. |
| 3,803,453 A | 4/1974 | Hull |
| 3,816,060 A | 6/1974 | Koskolos |
| 3,816,211 A | 6/1974 | Haigh |
| 3,837,946 A | 9/1974 | Gribbin |
| 3,887,737 A | 6/1975 | Baxter et al. |
| 3,900,676 A | 8/1975 | Alderson |
| 3,903,331 A | 9/1975 | Klein |
| 3,917,883 A | 11/1975 | Jepson |
| 3,918,895 A | 11/1975 | Mizuno |
| 3,928,706 A | 12/1975 | Gibbons |
| 3,936,554 A | 2/1976 | Squier |
| 3,953,566 A | 4/1976 | Gore |
| 3,956,552 A | 5/1976 | Geary |
| 3,969,559 A | 7/1976 | Boe |
| 3,979,538 A | 9/1976 | Gilman et al. |
| 3,989,869 A | 11/1976 | Neumaier et al. |
| 4,018,956 A | 4/1977 | Casey |
| 4,025,678 A | 5/1977 | Frank |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,088,708 A | 5/1978 | Riew |
| 4,102,562 A | 7/1978 | Harper et al. |
| 4,142,929 A | 3/1979 | Otomine et al. |
| 4,160,851 A | 7/1979 | Lienert et al. |
| 4,201,810 A | 5/1980 | Higashiguchi |
| 4,218,501 A | 8/1980 | Kameya et al. |
| 4,238,190 A | 12/1980 | Rejto |
| 4,263,373 A | 4/1981 | Mccaskey et al. |
| 4,269,885 A | 5/1981 | Mahn |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,308,296 A | 12/1981 | Chitouras |
| 4,314,813 A | 2/1982 | Masaki |
| 4,314,955 A | 2/1982 | Boden et al. |
| 4,319,942 A | 3/1982 | Brenner |
| 4,340,623 A | 7/1982 | Justus |
| 4,340,632 A | 7/1982 | Wells et al. |
| 4,352,924 A | 10/1982 | Wooten et al. |
| 4,362,773 A | 12/1982 | Shikinami |
| 4,369,157 A | 1/1983 | Conner |
| 4,385,093 A | 5/1983 | Hubis |
| 4,385,588 A | 5/1983 | Bennetot |
| 4,388,134 A | 6/1983 | Long et al. |
| 4,390,387 A | 6/1983 | Mahn |
| 4,396,662 A | 8/1983 | Higashiguchi |
| 4,405,401 A | 9/1983 | Stahl |
| 4,413,019 A | 11/1983 | Brenner |
| 4,418,106 A | 11/1983 | Landler et al. |
| 4,423,106 A | 12/1983 | Mahn |
| 4,430,372 A | 2/1984 | Knoke et al. |
| 4,465,723 A | 8/1984 | Knoke et al. |
| 4,539,166 A | 9/1985 | Richartz et al. |
| 4,574,018 A | 3/1986 | Masuda et al. |
| 4,582,658 A | 4/1986 | Reichmann et al. |
| 4,588,629 A | 5/1986 | Taylor |
| 4,652,478 A | 3/1987 | Maii |
| 4,668,323 A | 5/1987 | Lenards et al. |
| 4,670,089 A | 6/1987 | Hanson |
| 4,681,791 A | 7/1987 | Shibahashi et al. |
| 4,687,527 A | 8/1987 | Higashiguchi |
| 4,693,771 A | 9/1987 | Payet et al. |
| 4,741,791 A | 5/1988 | Howard et al. |
| 4,790,306 A | 12/1988 | Braun et al. |
| 4,793,884 A | 12/1988 | Horikiri |
| 4,797,320 A | 1/1989 | Kopp et al. |
| 4,810,321 A | 3/1989 | Wank et al. |
| 4,810,549 A | 3/1989 | Abrams et al. |
| 4,812,247 A | 3/1989 | Fahner et al. |
| RE33,032 E | 8/1989 | Binsack et al. |
| 4,895,748 A | 1/1990 | Squires |
| 4,906,464 A | 3/1990 | Yamamoto et al. |
| 4,923,848 A | 5/1990 | Akada et al. |
| 4,931,125 A | 6/1990 | Volkmann et al. |
| 4,937,115 A | 6/1990 | Leatherman |
| 4,938,955 A | 7/1990 | Niira et al. |
| 4,938,958 A | 7/1990 | Niira et al. |
| 4,961,896 A | 10/1990 | Constantino |
| 4,966,801 A | 10/1990 | Becker et al. |
| 4,972,015 A | 11/1990 | Carico et al. |
| 4,980,216 A | 12/1990 | Rompp |
| 4,985,296 A | 1/1991 | Mortimer, Jr. |
| 5,008,130 A | 4/1991 | Lenards |
| 5,009,943 A | 4/1991 | Stahl |
| 5,009,950 A | 4/1991 | Wagner et al. |
| 5,026,591 A | 6/1991 | Henn et al. |
| 5,041,104 A | 8/1991 | Seal |
| 5,043,375 A | 8/1991 | Henning et al. |
| 5,047,103 A | 9/1991 | Abrams et al. |
| 5,053,179 A | 10/1991 | Masui et al. |
| 5,059,452 A | 10/1991 | Squires |
| 5,077,116 A | 12/1991 | Lefkowitz |
| 5,104,723 A | 4/1992 | Freitag et al. |
| 5,108,530 A | 4/1992 | Niebling, Jr. et al. |
| 5,110,670 A | 5/1992 | Janocha et al. |
| 5,112,423 A | 5/1992 | Liebe, Jr. |
| 5,115,104 A | 5/1992 | Bunyan |
| 5,126,182 A | 6/1992 | Lumb et al. |
| 5,154,871 A | 10/1992 | Wagner et al. |
| 5,155,163 A | 10/1992 | Abeywardena et al. |
| 5,198,277 A | 3/1993 | Hamilton et al. |
| 5,207,851 A | 5/1993 | Abrams |
| 5,217,563 A | 6/1993 | Niebling et al. |
| 5,217,781 A | 6/1993 | Kuipers |
| 5,248,536 A | 9/1993 | Du Katz |
| 5,274,039 A | 12/1993 | Sirinyan et al. |
| 5,298,031 A | 3/1994 | Gabay et al. |
| 5,306,567 A | 4/1994 | Kuo et al. |
| 5,312,576 A | 5/1994 | Swei et al. |
| 5,346,746 A | 9/1994 | Abrams |
| 5,350,474 A | 9/1994 | Yamane |
| 5,350,830 A | 9/1994 | Kuo et al. |
| 5,358,789 A | 10/1994 | Kuo et al. |
| 5,383,996 A | 1/1995 | Dressler |
| 5,385,694 A | 1/1995 | Wu et al. |
| 5,403,884 A | 4/1995 | Perlinski |
| 5,411,783 A | 5/1995 | Mahn, Jr. |
| 5,413,841 A | 5/1995 | Mahn et al. |
| 5,480,506 A | 1/1996 | Mahn, Sr. et al. |
| 5,489,359 A | 2/1996 | Yamane |
| 5,503,179 A | 4/1996 | Till |
| 5,529,650 A | 6/1996 | Bowers et al. |
| 5,534,099 A | 7/1996 | Yamamoto |
| 5,543,195 A | 8/1996 | Squires et al. |
| 5,556,669 A | 9/1996 | Sasaki et al. |
| 5,564,249 A | 10/1996 | Borys et al. |
| 5,597,633 A | 1/1997 | Mecke et al. |
| 5,597,637 A | 1/1997 | Abrams et al. |
| 5,622,587 A | 4/1997 | Barthelman |
| 5,654,395 A | 8/1997 | Jackson, Jr. et al. |
| 5,665,458 A | 9/1997 | Mahn, Jr. |

| | | |
|---|---|---|
| 5,681,420 A | 10/1997 | Yamane |
| 5,685,223 A | 11/1997 | Vermuelen et al. |
| 5,693,400 A | 12/1997 | Hamilton et al. |
| 5,756,180 A | 5/1998 | Squires et al. |
| 5,762,379 A | 6/1998 | Salmon et al. |
| 5,766,397 A | 6/1998 | Jones |
| 5,771,796 A | 6/1998 | Morrison et al. |
| 5,804,007 A | 9/1998 | Asano |
| 5,851,617 A | 12/1998 | Keiser |
| 5,858,156 A | 1/1999 | Abrams et al. |
| 5,863,633 A | 1/1999 | Squires et al. |
| 5,900,096 A | 5/1999 | Zemel |
| 5,909,021 A | 6/1999 | Duffy |
| 5,912,065 A | 6/1999 | Kukoff |
| 5,914,176 A | 6/1999 | Myers |
| 5,922,436 A | 7/1999 | Banfield et al. |
| 5,981,009 A | 11/1999 | Iacono et al. |
| 5,997,995 A | 12/1999 | Scianna |
| 6,010,764 A | 1/2000 | Abrams |
| 6,083,332 A | 7/2000 | Abrams |
| 6,102,686 A | 8/2000 | Eschenfelder |
| 6,110,560 A | 8/2000 | Abrams |
| 6,113,149 A | 9/2000 | Dukatz |
| 6,146,485 A | 11/2000 | Iacono et al. |
| 6,170,881 B1 | 1/2001 | Salmon et al. |
| 6,171,678 B1 | 1/2001 | Holeschovsky et al. |
| 6,178,680 B1 | 1/2001 | Sloot |
| 6,202,549 B1 | 3/2001 | Mitsam et al. |
| 6,224,707 B1 | 5/2001 | Lion |
| 6,247,215 B1 | 6/2001 | Van Alboom et al. |
| 6,249,297 B1 | 6/2001 | Lion |
| 6,257,866 B1 | 7/2001 | Fritz et al. |
| 6,264,775 B1 | 7/2001 | Holeschovsky et al. |
| 6,277,312 B1 | 8/2001 | Hansen et al. |
| 6,296,908 B1 | 10/2001 | Reihs et al. |
| 6,299,715 B1 | 10/2001 | Langsdorf et al. |
| 6,350,504 B1 | 2/2002 | Alboom et al. |
| 6,361,855 B2 | 3/2002 | Mahn, Jr. et al. |
| 6,376,041 B1 | 4/2002 | Morrison et al. |
| 6,387,472 B1 | 5/2002 | Reck et al. |
| 6,428,877 B1 | 8/2002 | Suss et al. |
| 6,436,506 B1 | 8/2002 | Pinter et al. |
| 6,451,148 B1 | 9/2002 | Jenner |
| 6,555,648 B1 | 4/2003 | Hinds |
| 6,569,538 B1 | 5/2003 | Kaschel |
| 6,577,657 B1 | 6/2003 | Elschner et al. |
| 6,630,216 B2 | 10/2003 | Pophusen et al. |
| 6,646,022 B2 | 11/2003 | Okazaki et al. |
| 6,676,796 B2 | 1/2004 | Pinter et al. |
| 6,774,067 B2 | 8/2004 | Demott et al. |
| 6,783,184 B2 | 8/2004 | DiBattista et al. |
| 6,787,589 B2 | 9/2004 | Weaver et al. |
| 6,924,000 B2 | 8/2005 | Tallmadge |
| 6,929,771 B1 | 8/2005 | Abrams |
| 6,977,023 B2 | 12/2005 | Abrams |
| 7,135,518 B2 | 11/2006 | Bandou et al. |
| 7,229,680 B1 | 6/2007 | Crompton |
| 7,338,697 B2 | 3/2008 | Abrams |
| 7,344,769 B1 | 3/2008 | Abrams |
| 7,351,368 B2 | 4/2008 | Abrams |
| 7,364,782 B2 | 4/2008 | Abrams |
| 7,381,284 B2 | 6/2008 | Abrams |
| 7,390,552 B2 | 6/2008 | Abrams |
| 7,393,516 B2 | 7/2008 | Seo et al. |
| 7,393,576 B2 | 7/2008 | Abrams |
| 7,402,222 B2 | 7/2008 | Abrams |
| 7,410,682 B2 | 8/2008 | Abrams |
| 7,410,932 B2 | 8/2008 | Figueroa |
| 7,413,581 B2 | 8/2008 | Abrams |
| 7,461,444 B2 | 12/2008 | Deaett et al. |
| 2001/0008039 A1 | 7/2001 | Alboom et al. |
| 2001/0008672 A1 | 7/2001 | Norvell et al. |
| 2003/0129353 A1 | 7/2003 | Abrams |
| 2003/0203152 A1 | 10/2003 | Higgins et al. |
| 2004/0010093 A1 | 1/2004 | Wefringhaus et al. |
| 2004/0033334 A1 | 2/2004 | Merovitz |
| 2004/0050482 A1 | 3/2004 | Abrams |
| 2004/0170799 A1 | 9/2004 | Carr et al. |
| 2005/0081985 A1 | 4/2005 | Abrams |
| 2005/0158508 A1 | 7/2005 | Abrams |
| 2005/0188447 A1 | 9/2005 | Gray |
| 2005/0196594 A1 | 9/2005 | O'Rell et al. |
| 2005/0260378 A1 | 11/2005 | Bernabeu |
| 2005/0268407 A1 | 12/2005 | Abrams |
| 2006/0026778 A1 | 2/2006 | Lion |
| 2006/0029767 A1 | 2/2006 | Lion |
| 2006/0142405 A1 | 6/2006 | Kijima |
| 2006/0150300 A1 | 7/2006 | Hassan et al. |
| 2006/0160943 A1 | 7/2006 | Weir |
| 2006/0251852 A1 | 11/2006 | Abrams |
| 2006/0257618 A1 | 11/2006 | Pascual Bernabeu |
| 2007/0003761 A1 | 1/2007 | Miyazono et al. |
| 2007/0022548 A1 | 2/2007 | Abrams |
| 2007/0026189 A1 | 2/2007 | Abrams |
| 2007/0102093 A1 | 5/2007 | Abrams |
| 2007/0110949 A1 | 5/2007 | Abrams |
| 2007/0148397 A1 | 6/2007 | Abrams |
| 2007/0219073 A1 | 9/2007 | Mannschedel |
| 2007/0289688 A1 | 12/2007 | Abrams |
| 2008/0003399 A1 | 1/2008 | Abrams |
| 2008/0006968 A1 | 1/2008 | Abrams |
| 2008/0050548 A1 | 2/2008 | Abrams |
| 2008/0095973 A1 | 4/2008 | Abrams |
| 2008/0102239 A1 | 5/2008 | Abrams |
| 2008/0111047 A1 | 5/2008 | Abrams |
| 2008/0113144 A1 | 5/2008 | Abrams |
| 2008/0124503 A1 | 5/2008 | Abrams |
| 2008/0145585 A1 | 6/2008 | Abrams |
| 2008/0187706 A1 | 8/2008 | Lion et al. |
| 2009/0280290 A1 | 11/2009 | Weedlun |
| 2010/0178445 A1 | 7/2010 | Shen et al. |
| 2010/0233410 A1 | 9/2010 | Abrams |
| 2010/0276060 A1 | 11/2010 | Abrams |
| 2010/0316832 A1 | 12/2010 | Abrams |
| 2011/0052859 A1 | 3/2011 | Abrams |

FOREIGN PATENT DOCUMENTS

| | | |
|---|---|---|
| CA | 2010076 | 8/1990 |
| CA | 1306411 | 8/1992 |
| CA | 2064300 | 9/1992 |
| DE | 3004560 | 8/1981 |
| DE | 202835 | 10/1983 |
| DE | 19707381 | 8/1998 |
| DE | 19734316 | 2/1999 |
| EP | 0122656 | 10/1984 |
| EP | 0210304 | 2/1987 |
| EP | 0280296 | 8/1988 |
| EP | 0351079 | 1/1990 |
| EP | 0506601 | 9/1992 |
| EP | 0685014 | 12/1995 |
| EP | 0913271 | 10/1998 |
| EP | 0989227 | 3/2000 |
| EP | 1072712 | 1/2001 |
| EP | 1557206 | 7/2005 |
| EP | 1598463 | 11/2005 |
| FR | 1480860 | 5/1967 |
| FR | 2210149 | 7/1974 |
| FR | 2442721 | 8/1980 |
| FR | 2543984 | 10/1984 |
| FR | 2659094 | 9/1991 |
| FR | 2784619 | 4/2000 |
| FR | 2846202 | 4/2004 |
| FR | 2881149 | 7/2006 |
| GB | 1171296 | 11/1969 |
| GB | 1447049 | 8/1976 |
| GB | 1466271 | 3/1977 |
| GB | 2065031 | 6/1981 |
| GB | 2101932 | 1/1983 |
| GB | 2126951 | 4/1984 |
| GB | 2214869 | 9/1989 |
| IE | 55104 | 10/1984 |
| JP | 71007184 | 6/1965 |
| JP | 55079143 | 6/1980 |
| JP | 56058824 | 5/1981 |
| JP | 56107080 | 8/1981 |
| JP | 56108565 | 8/1981 |
| JP | 56141877 | 11/1981 |
| JP | 58062027 | 4/1983 |

| | | |
|---|---|---|
| JP | 59106944 | 6/1984 |
| JP | 59115885 | 7/1984 |
| JP | S61-146368 | 7/1986 |
| JP | 62-033576 | 2/1987 |
| JP | 62-144911 | 6/1987 |
| JP | 64-014021 | 1/1989 |
| JP | S64-068582 | 3/1989 |
| JP | 01192538 | 8/1989 |
| JP | 01-266284 | 10/1989 |
| JP | 01-310947 | 12/1989 |
| JP | 02048076 | 2/1990 |
| JP | 04-126221 | 4/1992 |
| JP | 04-169297 | 6/1992 |
| JP | 5-201196 | 8/1993 |
| JP | 06-171048 | 6/1994 |
| JP | 08-267625 | 10/1996 |
| JP | 10-202691 | 8/1998 |
| JP | 11-042749 | 2/1999 |
| JP | 11256484 | 9/1999 |
| JP | 11277662 | 10/1999 |
| JP | 11348159 | 12/1999 |
| JP | 2000084977 | 3/2000 |
| JP | 3076851 | 8/2000 |
| JP | 2000263673 | 9/2000 |
| JP | 2001-226885 | 8/2001 |
| JP | 2001270019 | 10/2001 |
| KR | 2003063833 | 7/2003 |
| WO | WO 79/01146 | 12/1979 |
| WO | WO 89/01829 | 3/1989 |
| WO | WO 90/09289 | 8/1990 |
| WO | WO 92/04502 | 3/1992 |
| WO | WO 93/12283 | 6/1993 |
| WO | WO 94/19530 | 9/1994 |
| WO | WO 97/34507 | 9/1997 |
| WO | WO 02/07959 | 1/2002 |
| WO | WO 02/09925 | 2/2002 |
| WO | WO 02/058854 | 8/2002 |
| WO | WO 03/031083 | 4/2003 |
| WO | WO 2004/005023 | 1/2004 |
| WO | WO 2004/005600 | 1/2004 |

OTHER PUBLICATIONS

U.S. Appl. No. 12/580,120, filed Oct. 15, 2009, Abrams.
U.S. Appl. No. 12/397,946, filed Mar. 4, 2009, Abrams.
Bright, Larry. "Trouble Shooting Continuous Thermosol Dyeing of Polyester Fiber and Blends". American Dyestuff Reporter, Aug. 1996, pp. 60-61.
Supplementary European search report for European Patent Application No. 01955942.6, mailed May 11, 2009.
Official Action (including partial translation) for Japanese Patent Application No. 2002-516079, dated Aug. 17, 2010.
"PolyOne—OnFlexTM-S EH Economy Grades (High Density)", PolyOne® Corporation 2007, pp. 1-2.
"PolyOne—OnFlexTM-S EL Economy Grades (Low Density)", PolyOne® Corporation 2007, pp. 1-2.
"PolyOne—OnFlexTM-S FG Food Contact Grades", PolyOne® Corporation 2007, pp. 1-2.
"PolyOne—OnFlexTM-S KE Grades for 2K Moulding on Engineered Thermoplastics", PolyOne® Corporation 2007, pp. 1-2.
"PolyOne—OnFlexTM-S Thermoplastic Elastomer Compounds", PolyOne® Corporation 2007, pp. 1-6.
"PolyOne—Synprene RT-3750", PolyOne® Corporation Feb. 9, 2010, 1 page.
"PolyOne—OnFlex™-S Styrenic Thermoplastic Elastomers", printed Feb. 9, 2010, 2 pages.
"PolyOne—Synprene RT-3790", PolyOne® Corporation Feb. 9, 2010, 1 page.
"PolyOne—Synprene RT-3850MS", PolyOne® Corporation Feb. 9, 2010, 1 page.
"PolyOne—Synprene RT-3870M", PolyOne® Corporation Feb. 9, 2010, 1 page.
"PolyOne—Synprene RT-3770", PolyOne® Corporation Feb. 9, 2010, 1 page.
"Versaflex® OM Series Material Review", TPE Tips, Issue 5, GLS Corporation Rev. Jan. 12, 2007, 2 pages.
"Versaflex® OM 3060-1—Technical Data Sheet", GLS Corporation, available at http://glscorporation.com/gls2/print.jsp?productID=182, Feb. 9, 2010, 2 pages.
U.S. Appl. No. 13/046,155, filed Mar. 11, 2011, Abrams.
U.S. Appl. No. 13/164,651, filed Jun. 20, 2011, Abrams.
U.S. Appl. No. 13/164,530, filed Jun. 20, 2011, Abrams.
Official Action for European Patent Application No. 1955942.6, dated Jul. 14, 2011.
U.S. Appl. No. 29/058,551, filed Aug. 19, 1996, Abrams.
U.S. Appl. No. 09/548,839, filed Apr. 13, 2000, Abrams.
U.S. Appl. No. 11/972,440, filed Jan. 10, 2008, Abrams.
U.S. Appl. No. 12/031,445, filed Feb. 14, 2008, Abrams.
"Flockin' to Precision"; Images Magazine; Feb. 1992, 1 page.
"Magic Carpet" Wired Magazine (Nov. 1998), p. 68.
"Hettinga: Plastics Technology for the Future, Available Today!" website (circa 2000), 4 pages.
Agion Technologies, LLC., The Most Advanced Antimicrobial Silver Delivery System; (date unknown).
Bayer Plastics Division Press Release, Wheel Covers, Center Caps Become Revolving Art Forms with New Film Insert Molding Technology, Jun. 19, 2000; 4 pages.
Bostik USA; "Industrial Adhesives" (2001), 3 pages.
Bostik USA; Web & Powder Adhesives; 2000; 2 pgs.
Bostik, "Technical Data Sheet PE103 Web Adhesives", revised Feb. 7, 2006, 5 pages.
Brown Abrams, "Flocking a Touch of Velour" ScreenPrinting (Apr. 1987).
Brown Abrams, "Part II: Flocking" ScreenPrinting (Jun. 1987).
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Defosse; "Systems Approach Gives Blow Molders Big Edge", 2000.
GE Structured Products, "Lexan® In-Mold Films: A Guide for Designing, Forming and Molding with Screenprinted Lexan® Films" (Jan. 1999), pp. 1-20.
Griffin, Patrick J., "Film Insert Molding," SGIA Journal, First Quarter 2001, pp. 31-36.
Landwehr, Rebecca, "When is a mouse pad really a rug?" The Denver Business Journal (Nov. 1998), at http://denverbizjournalscom/denver/stories/1998/11/30/story3html.
Lextra® MouseRug®; "About the Product" (Jan. 27, 1999), http://www.mouserug.com/mouserug/aboutmouserugs.html, 2 pages.
Lextra® MouseRug®; "Dimensions" (Jan. 27, 1999), http://www.mouserug.com/mouserug/dimensions.html, 1 page.
Lextra® MouseRug®; "MouseRug Components" (Jan. 27, 1999), http://www.mouserug.com/mouserug/mousecomp.html, 1 page.
Mark Matsco, Patrick Griffin, Film Insert Molding Technology, 1997.
Peterson, Jeff, "New Innovations in 3D Curved Parts Decorating," Plastics Decorating (Oct.-Nov. 2001), available at http://www.petersonpublications.com/plasticsdecorating/articlesdisplay.asp?ID=17, 3 pages.
Shaner, Ken, "Advanced Molding Processes: Low Pressure Molding/Low-High Pressure Molding for Interior Trim," Automotive & Transportation Interior Expo Conference 1997, Session 9, pp. 1-2.
Snyder, Merle R., "Fabric Molding Shows Promise in Automotive: Machine Makers Offer Innovative Systems That Boost Productivity and Facilitate Recyclability," Modern Plastics (Oct. 1999), available at http://www.modplas.com/new/month_1099/ms10.htm.
Sonics & Materials, Inc., "Chart II Compatability of Thermoplastics" (undated), 1 page.
Stahls', New Product Bulletin; 7 pages; Jan. 2008.

Takatori, Hiroyuki, "Dieprest In-mold Laminate Technology," Automotive & Transportation Interiors Expo Conference 1999, Session 12, pp. 1-4.

Bicomponent Fibers, available at http://web.utk.edu/~mse/pages/Textiles/Bicomponent%20fibers.htm, Updated Apr. 2004, 8 pages.

"The largest range of plastic powder adhesives", Dynamic Coating Technology Schaetti Fix, date unknown, 8 pages.

"The largest range of thermoplastic powders", Dynamic Coating Technology Schaetti Fix, date unknown, 8 pages.

"SCHAETTI FIX 6040" Technical Data Sheet, Schaetti Fix, Jan. 3, 2006, 1 page.

"SCHAETTI FIX 6005" Technical Data Sheet, Schaetti Fix, Jan. 1, 2006, 1 page.

"SCHAETTI FIX 6012" Technical Data Sheet, Schaetti Fix, Jan. 1, 2006, 1 page.

"Made of makrolon High-tech plastic from Bayer" General Purpose Product Data, Sheffield Plastics Inc., 2003, 2 pages; Jul. 2005.

"Makrolon GP Solid polycarbonate sheet", Product Data Sheet, Oct. 2004, 2 pages.

"Makrolon GP Solid polycarbonate sheets", General Purpose Product Data Sheet, Laserlite Australia, date unknown, 2 pages; Jan. 2008.

"E/Barrier Material Safety Data Sheet (MSDS)", Midsun Group, Apr. 4, 2006, pp. 1-5.

"Material Safety Data Sheet", Nationwide Plastics, Inc., Jan. 1, 2007, pp. 1-6.

"Neoprene polychloroprene Technical Information", Rev. 5, Oct. 2003, pp. 1-16.

Background of the Invention for the above-captioned application (previously provided).

Declaration of L. Brown Abrams Under 37 CFR § 1.98 for U.S. Appl. No. 09/735,721 dated Jan. 16, 2004, 2 pages.

Declaration of L. Brown Abrams under 37 CFR § 1.98 for U.S. Appl. No. 09/621,830 dated Jan. 7, 2003, 2 pages.

Declaration of L. Brown Abrams under 37 CFR § 1.98 for U.S. Appl. No. 10/394,357 dated Jan. 16, 2004, 4 pages with Appendix A-I.

Declaration of L. Brown Abrams under 37 CFR 1.132 for U.S. Appl. No. 09/735,721 dated Jan. 7, 2003.

Declaration of L. Brown Abrams under 37 CFR § 1.98 for U.S. Appl. No. 09/621,830 dated Jan. 16, 2004, 2 pages.

Declaration of L. Brown Abrams under 37 CFR § 1.98 for U.S. Appl. No. 10/394,357 dated Jan. 3, 2007, 4 pages with Appendix A-I.

Second Supplemental Declaration of L. Brown Abrams under 37 CFR §1.132 for U.S. Appl. No. 09/548,839 executed Jan. 7, 2003.

Supplemental Declaration of L. Brown Abrams under 37 CFR § 1.132 for U.S. Appl. No. 09/548,839 executed Oct. 23, 2002.

Declaration of Louis Brown Abrams under 37 CFR § 1.98, for U.S. Appl. No. 11/460,493, signed Jan. 11, 2008, 5 pages.

PCT International Search Report, issued Nov. 19, 2001, in corresponding PCT application PCT/US01/23278.

PCT Written Opinion mailed Sep. 11, 2002 in corresponding PCT application PCT/US01/23278.

PCT International Preliminary Examination Report, issued Dec. 19, 2002, in corresponding PCT application PCT/US01/23278.

Office Action, issued Jun. 15, 2005, in corresponding Australian Patent Application No. 2001277991.

Office Action received in corresponding Chinese Patent Application No. 01815554.5 (English translation included); Mar. 2005.

Notification of Submission of a Written Statement (including translation) for Korean Patent Application No. 10-2003-7001528, transmitted May 11, 2006.

Notification of Submission of a Written Statement for Korean Patent Application No. 10-2003-7001528, transmitted Feb. 12, 2007.

Notification of Reasons for Rejection (including translation) for Korean Patent Application No. 10-2003-7001528, transmitted Aug. 13, 2007.

Official Action for U.S. Appl. No. 10/394,357, mailed Nov. 18, 2005.

Official Action for U.S. Appl. No. 10/394,357, mailed Nov. 2, 2006.

Official Action for U.S. Appl. No. 10/394,357, mailed Apr. 25, 2006.

Official Action for U.S. Appl. No. 10/394,357, mailed Mar. 1, 2007.

"Polymers", Chemistry, Unit 16, date unknonwn, pp. 313-325.

CO-MOLDED DIRECT FLOCK AND FLOCK TRANSFER AND METHODS OF MAKING SAME

CROSS-REFERENCE TO RELATED APPLICATIONS

The present application is a divisional application of U.S. application Ser. No. 10/394,357, filed Mar. 21, 2003, now U.S. Pat. No. 7,338,697, which is a continuation-in-part of each of U.S. patent application Ser. No. 09/629,746, filed Jul. 31, 2000, now U.S. Pat. No. 6,929,771, and Ser. No. 09/621, 830, filed Jul. 24, 2000, now U.S. Pat. No. 7,344,769, and claims the benefits under 35 U.S.C. §119 of each of U.S. Provisional Application Ser. Nos. 60/366,580, filed Mar. 21, 2002 now abandoned; 60/393,362, filed Jul. 3, 2002 now abandoned; 60/416,098, filed Oct. 4, 2002 now abandoned; and 60/443,986 filed Jan. 30, 2003 now abandoned, each of which is to Abrams and is incorporated herein by this reference.

FIELD OF THE INVENTION

This invention relates generally to flocked articles and specifically to molded articles having flocked surfaces.

BACKGROUND OF THE INVENTION

It is often desirable to decorate molded plastic parts for aesthetic or practical purposes. Injection molded articles are often decorated using inks, screen printing, pad printing, direct electrostatic flocking and hot stamping. These methods are most often post-molding operations requiring additional processing and cost and time. In addition, the resulting quality of the product is often low, due to the low quality of adhesion or unevenness of the coating.

Recently, In-Mold Decoration (IMD) has been developed to incorporate the application of decoration while the part is being molded to eliminate the extra step of post mold decorating. However, a number of problems have developed with the IMD technology. By way of example, the ink or decoration is typically unable to remain stable during the heat and force of injecting the resins into the mold. During resin injection into the mold, the decoration is often dislocated, leading to an unacceptable finished article. The pressure, heat, and shear force exerted on the decoration during resin injection may also cause the decoration surface to become smeared, crushed, or otherwise disturbed during injection molding.

SUMMARY OF THE INVENTION

These and other needs are addressed by the present invention. The invention generally provides a flocked molded article and methods for producing the article.

In one aspect of the present invention, a method of decorating a molded article is provided that includes the steps of:

(a) providing a mold insert comprising a plurality of flock fibers and a permanent adhesive layer;

(b) positioning the mold insert in a mold; and (c) introducing resin into the mold. The resin contacts the mold insert to form a molded article. To provide a barrier to the entry of the resin between and among the flock fibers, the melting point of the permanent adhesive layer is greater than a temperature of the resin during molding.

The mold insert may be in any suitable configuration. The mold insert may include a backing film and may be in the form of a pre-formed direct flocked article or flocked transfer film. As will be appreciated, a transfer includes a release sheet engaging first ends of the flock fibers while the permanent adhesive layer engages opposing second ends of the flock fibers.

The permanent adhesive layer may be any suitable adhesive, such as thermoset and thermoplastic adhesives. The adhesive is typically in the form of a cast or extruded continuous film. To permit the mold insert to be formed into a three dimensional shape, the permanent adhesive layer is not a fabric. The permanent adhesive is at least partially (and typically fully) activated before positioning of the mold insert in the mold.

As noted, the mold insert may include a backing film such that the permanent adhesive layer is positioned between the flock fibers and the backing film. The backing film can be any suitable material, with polystyrene, an acrylic polymer, polyvinyl, polyolefin, cellulose, polycarbonate, polyester, ABS, polypropylene, polyettrelene, and mixtures and composites thereof being preferred. As in the case of the permanent adhesive layer, the backing film is a cast or extruded continuous film and is not a fabric to permit the backing film to be formed into a three-dimensional shape. To provide a plush feel, the flock fibers are oriented at least substantially perpendicular to adjacent planar or substantially planar (upper) surfaces of the permanent adhesive layer and backing film.

For additional aesthetic appeal, the mold insert may include a design media other than the flock fibers. Examples of such additional media include coatings, beads, metallic flakes, glitter, reflective material, etc.

The mold insert may be pre-formed into a three dimensional shape, such as by thermoforming, vacuum forming and hydro-forming techniques. The three dimensional shape helps the mold insert maintain a desired position in the mold during resin injection. To provide melt bonding with the resin, the backing film preferably has a melting point that is at or above the maximum temperature experienced by the backing film during molding and a chemical composition compatible with that of the resin. As in the case of the adhesive layer, the backing film is preferably a cast or extruded continuous film and not a fabric. Another adhesive may be located between the permanent adhesive layer and the backing film to adhere the adhesive layer to the backing film.

The present invention can have a number of advantages compared to conventionally decorated molded articles. First, attractive, multicolored flock insert molded articles can be manufactured inexpensively and in high volumes. Second, the process can be relatively simple and require at most a modest capital investment. Third, imaging techniques such as screen printing or cutting permits portions of the design to be easily omitted or separated, as desired. The ability to create voids in the finished design where desired, could eliminate subsequent cutting and/or picking out of material to be eliminated (like the center of the letter "O"). This ability permits novel design configurations, such as designs where the backing film is exposed as part of the overall design. Alternatively, part of the adhesive can be left exposed and the adhesive then sprinkled with or dipped into a design medium to fill the exposed area of the resin dispersion. The exposed area can thus be used for inclusion of different types of design media materials (like textiles, holograms, glitter particles, beads, etc.) incorporated into the molded article to create interesting, mixed media looks. Fourth, the various processes described herein can produce multi-colored flocked surfaces on molded articles. Such articles have higher perceived values (as one can make attractive multi-colored designs, simulated textile looks, logos, etc.) when compared to single colored molded articles. The (pre-colored or permanently colored) multi-colored flock (either producer colored (or pigment-in-colored) or dyed flock) can be selected to provide superior soil and stain concealment and resistance to chemical or high UV exposure, which can be particularly important in automotive or outdoor use. In contrast, single colored molded articles will readily show lint, soil, stains, etc. Additionally, multi-colored flock can have functional value, such as graphically or visually producing strips for a grip handle, insulation value, and other benefits, such as sweat absorption and comfort.

These and other advantages and aspects of the invention will be evident from the discussion herein.

DETAILED DESCRIPTION OF THE INVENTION

In one embodiment, a flock heat transfer type media is used rather than ink-printed film inserts or decorations to provide a plush, evenly-coated, three-dimensional single or multi-colored textured decoration molded together with the hot resins when the part is formed. Using flock transfer media, a plushly textured decoration is permanently attached to the surface of the molded part. To accomplish this the hot melt adhesive commonly used with flock heat transfer manufacturing is eliminated so it will not liquefy and ooze out around the decoration in the mold. In addition, another adhesive, such as a tie coat material or other compatible film, may be used instead of a normal hot melt to prevent oozing and to promote adhesion, melt bond and/or chemical compatibility with the molding resin, when injecting molding a flock transfer directly to the polymer molded article.

The mold may have a depression or locating pins or other mechanical parts to assist with aligning and holding the flock transfer in place. Additionally, "dams" built into the mold around the perimeter of the flock transfer may be included to prevent seepage of the molding resin into the interstitial spaces of the flock transfer, between the fibers.

To stabilize the position of the flock transfer in the injection mold, the molding process may be modified for example by purposely selecting resins of lower melting point or by injecting the resins in two separate stages, a first more "gentle" injection to set the transfer in place, followed up by a full-pressure normal injection of resin.

Figure 1:
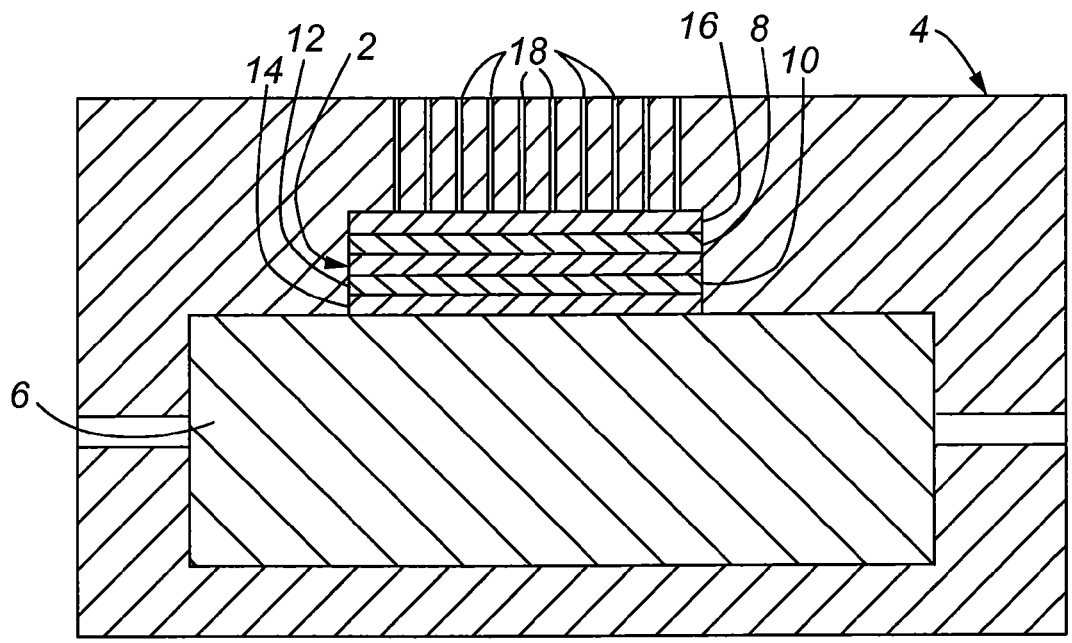
FIG. 1 is a cross-sectional view a flock transfer being applied to an article in a mold, wherein the transfer lies on top of the article.

Referring to FIG. 1, a flock transfer 2 of the present invention is shown in place in a mold 4 to be co-molded with a plastic article 6. In FIG. 1. The transfer 2 is shown on top of the article 6. The transfer 2 comprises a dimensionally stable sheet 8 to which a conventional flock transfer release adhesive 10, usually silicone or latex wax, is applied in the reverse of a desired pattern or with overall coverage of the sheet, corresponding to the overall image which is to be flocked and transferred. The flock 12 which may be rayon or any other type of material with a conductive finish such as nylon, polyester or the like is applied to the activated adhesive, 10 in any conventional manner, such as, conventional electrostatic techniques, vibration, air flow, gravity, or combination thereof. The method of applying the flock 12 to the adhesive 10 depends on the transfer to be achieved—will the transfer be one color or several colors, will the transfer include any non-flock decorations, etc. Thus, the transfer itself, can be a conventional flock transfers, Lextra®, Lextra® II, or Lextra® 3-D type transfer, flocked roll goods such as made by Societe D'Enduction et de Flokage, located in Laval, France, from which pieces may be cut out and even pre-formed to fit better into molds where the surface of the finished product is not flat. The lower ends of the flock 12 are coated with a permanent binder adhesive 14, such as a water based latex or thermoset or thermoplastic film, which binds the flock into a unit. The binder 14 may contain an additional adhesive or compatible film, for promoting the adhesion of the transfer to the resin in molding.

A relatively weak pressure-sensitive adhesive 16 can be added to the carrier film 8 in a separate layer, for the purpose of helping to locate the flock transfer 2 in position inside the mold 4 if no mechanical device is available.

Figure 2:
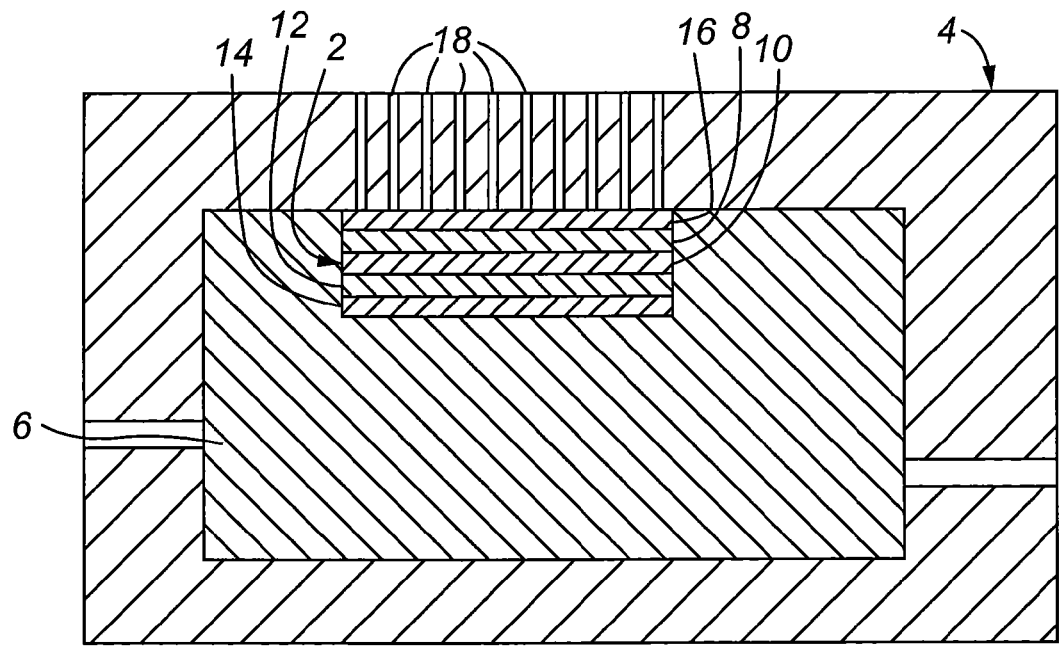
FIG. 2 is a cross-sectional view similar to FIG. 1, but wherein the flock transfer is imbedded in the article.

FIGS. 1 and 2 illustrate the application of the transfer 2 to a molded article 6 during the molding process. The transfer 2 is positioned in the mold 4 using the pressure-sensitive adhesive 12. Other methods. such as the use of a vacuum, can be used to hold the transfer 2 in place in the mold 4 during the molding operation. Vacuum holes 18 are shown in the mold 4 which pass through the mold body. As seen, the transfer 2 is in contact with the vacuum holes 18. A vacuum can be drawn through the holes 18 to hold the transfer 2 in place. The flock transfer needs to be held securely in the mold in order to maintain the transfer in the desired location on the finished plastic part. If a slight depression (of about 1 mm) is built into the mold cavity to accommodate the flock transfer, it will be flush with the molded plastic surface of the finished part. This is seen in FIG. 2. If there is no depression, the flock decoration will stand up on top of the plastic surface, as seen in FIG. 1.

After the transfer is positioned in the mold, the mold is closed and hot resin is injected into the mold. To ensure that the transfer will stay in position during the resin injection, resin with a lower melting point than the release adhesive 16 may be used to avoid dislocation of the transfer. On the other hand, if the melt point of any release adhesive utilized, is higher than that of resin, due to the flock providing insulation to the release adhesive, the release adhesive will really not melt in the first place. Hence, criticality of this melting point may not be that necessary. A method of molding is Reaction Injection Molding (RIM) wherein two base resins are mixed together just as they enter the mold, a chemical reaction occurs at low heat and the plastic material of the end product is formed at that instant.

In an alternative method, lower-pressure injection may be used in a first stage in order to locate and secure the flock transfer in its precise position to reduce the effects of shear. Once the transfer is secured in place by the material of the initial injection, a second, full-pressure injection is made to finish the part.

After the resin is injected into the mold, the mold is cooled by circulating water around the exterior of the mold. Although, in some injection molding processes, utilizing resin, cooling water may already be circulating through the die, during the injection molding process, and thereafter, as known in the art. The mold can be cooled in any other conventional manner. As the resin cools, it solidifies and forms a permanent melt bond to the binder 14. When the part is cooled sufficiently the mold opens up and the part is ejected. Finally, the release sheet 8 and release adhesive 10 are peeled off the fibers 12 to reveal a finished, flocked surface on the newly molded part.

As an alternative to the invention as described above, it is likely that the flock 12 can be held by other means, to the molded polymer part 6, as follows. While the various release sheets, and release adhesive, may be initially applied to the upper surface of the flock layer, to hold it in position, during molding, rather than utilizing a permanent binder adhesive 14, to hold the flock within or to the molded part, there may be used a thermoset polyester film, such as available from Bostik, Inc., to permanently adhere the ends of the flock material thereto, and likewise, such a sheet will be cross linked into permanent connection with the molded polymer part 6, to provide a very inherently appearing flock surface, upon the molded part, when finished. Thus, the thermosetting polymer material, when activated, directly bonds with the flock on one side and the resin/backing film on the other, in the injection molding process, and cures with it, to form a permanently flocked product.

Figure 3:
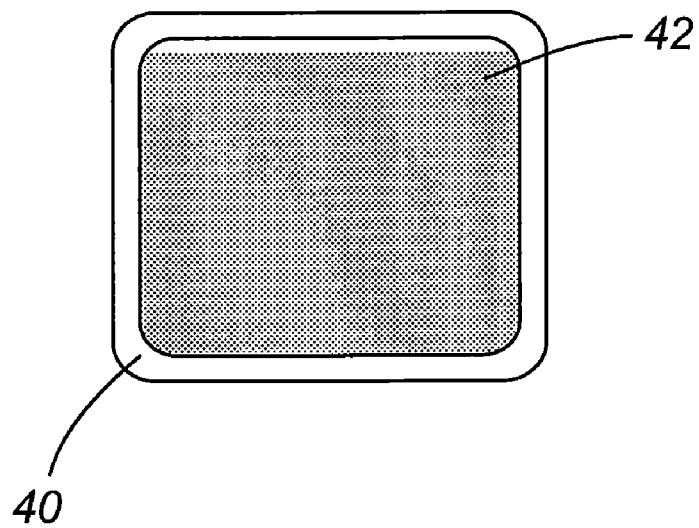
FIG. 3 is a top plan view of an embodiment of the present invention showing the flock transfer inside an injection mold-cavity, wherein the flock transfer is created with a border.

Since the flock of the transfer forms interstitial spaces between fibers, it is desirable to form a barrier between the mold and the perimeter of the transfer to prevent the resin from entering these interstitial spaces during injection of the resin into the mold. Referring to FIG. 3, a barrier 40 may be formed around the transfer 42. Barrier 40 can be formed during the fabrication of the flock transfer, by providing an excess of binder adhesive 14 around the edge of the transfer. The excess binder adhesive 14 will form a rib or dam around the periphery of the transfer.

Figure 4:
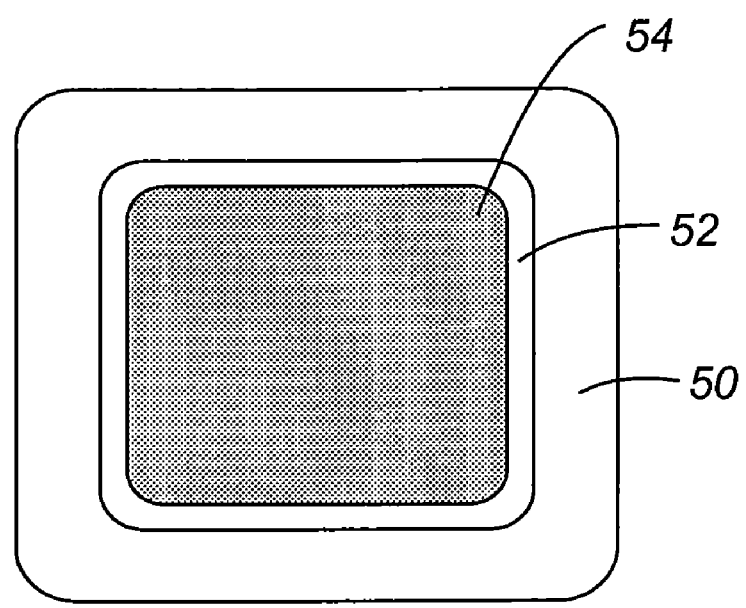
FIG. 4 is a top plan view of an embodiment of the present invention showing the flock transfer inside an injection mold, wherein the mold contains a border.

Alternatively, referring to FIG. 4, the mold 50 may be provided with a barrier 52, which surrounds transfer 54 when the transfer is placed in the mold. Barrier 52 may be an integral part of mold 50, or may be a separate, added barrier which is composed of silicone, latex or other suitable sealing material.

Figure 5:
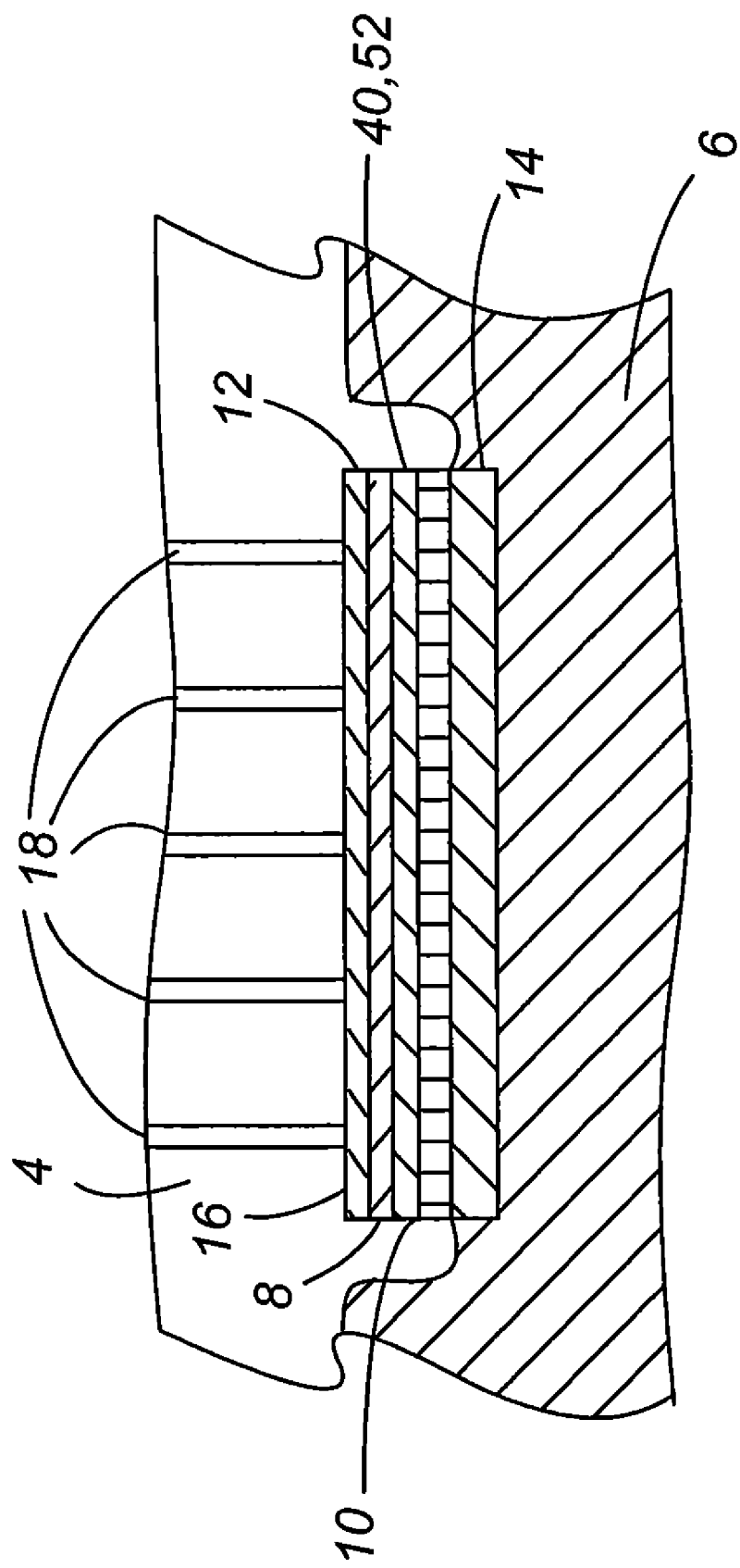
FIG. 5 depicts a side cross-sectional view of an embodiment of the present invention showing the flock transfer inside an injection mold, wherein the mold contains a border.

Referring to FIG. 5, which is a side cross-sectional view of the mold of FIGS. 3 and 4, the barrier or dam 40, 52 surrounding at least a portion of the transfer 2 is depicted. As noted above, the transfer 2 comprises a pressure sensitive adhesive 16, dimensionally stable (carrier) sheet 8, transfer release adhesive 10, flock 12, and binder 14.

The in mold flock transfer of the present invention finds particular utility in finished plastic parts where a plush surface is desired.

As will be appreciated, the solidified resin can be any biodegradable or non-biodegradable moldable material. Preferably, the resin is a condensation or addition polymer having thermoplastic behavior. More preferably, the resin is a high polymer of one or more of a fluorocarbon, hydroxy acid, carboxylic acid, ester, ketone, hydroxy carboxylic acid, tetrafluoroethylene, nylon, phenol, formaldehyde, amide, imide, aryl, ketone, cellulose, ethylene, styrene, urethane, carbonate, isocyanate, vinyl, vinyl chloride, olefin, acetate, propylene, methyl methacrylate, vinyl acetate, ethylene terephthalate, cyclohexylenedimethylene terephthalate, ethylene glycol, terephthalic acid, hexamethylene diamine, sebacic acid, and butylene terephthalate and copolymers, terpolymers, composites, and blends thereof or an amino resin, epoxy resin, acrylic resin, silicones, and ABS resin. The resin can be in the form of a solid, liquid, semi-solid, or semi-liquid when injected into the mold and typically polymerizes in the mold due to heat and/or chemical reaction. As will be appreciated, a thermoplastic is a high polymer that softens when exposed to heat and returns to its original condition when cooled to room temperature.

In other embodiments, the transfer takes a number of forms other than that shown in FIG. 1. Other configurations of transfers that can be used with the present invention include, for example, those described in my patents and patent applications, including but not limited to U.S. Pat. Nos. 4,810,549; 5,047,103; 5,207,851; 5,346,746; 5,597,637; 5,858,156; 6,010,764; 6,083,332; 6,110,560; U.S. patent application Ser. No. 09/735,721 filed Dec. 13, 2000; Ser. No. 09/621,830 filed Jul. 24, 2000; Ser. No. 29/058,551 filed Aug. 19, 1996; Ser. No. 09/548,839 filed Apr. 13, 2000; Ser. No. 09/973,113 filed Oct. 9, 2001; and U.S. Provisional Applications Ser. Nos. 60/327,642, filed Oct. 5, 2001, 60/344,862, filed Nov. 8, 2001, and 60/332,647, filed Nov. 21, 2001. In these various disclosures the backing film (discussed below) can be replaced for the substrate to which the transfer is attached. The entireties of these patents and patent applications are incorporated herein by reference as if fully set forth.

Figures 6, 7:
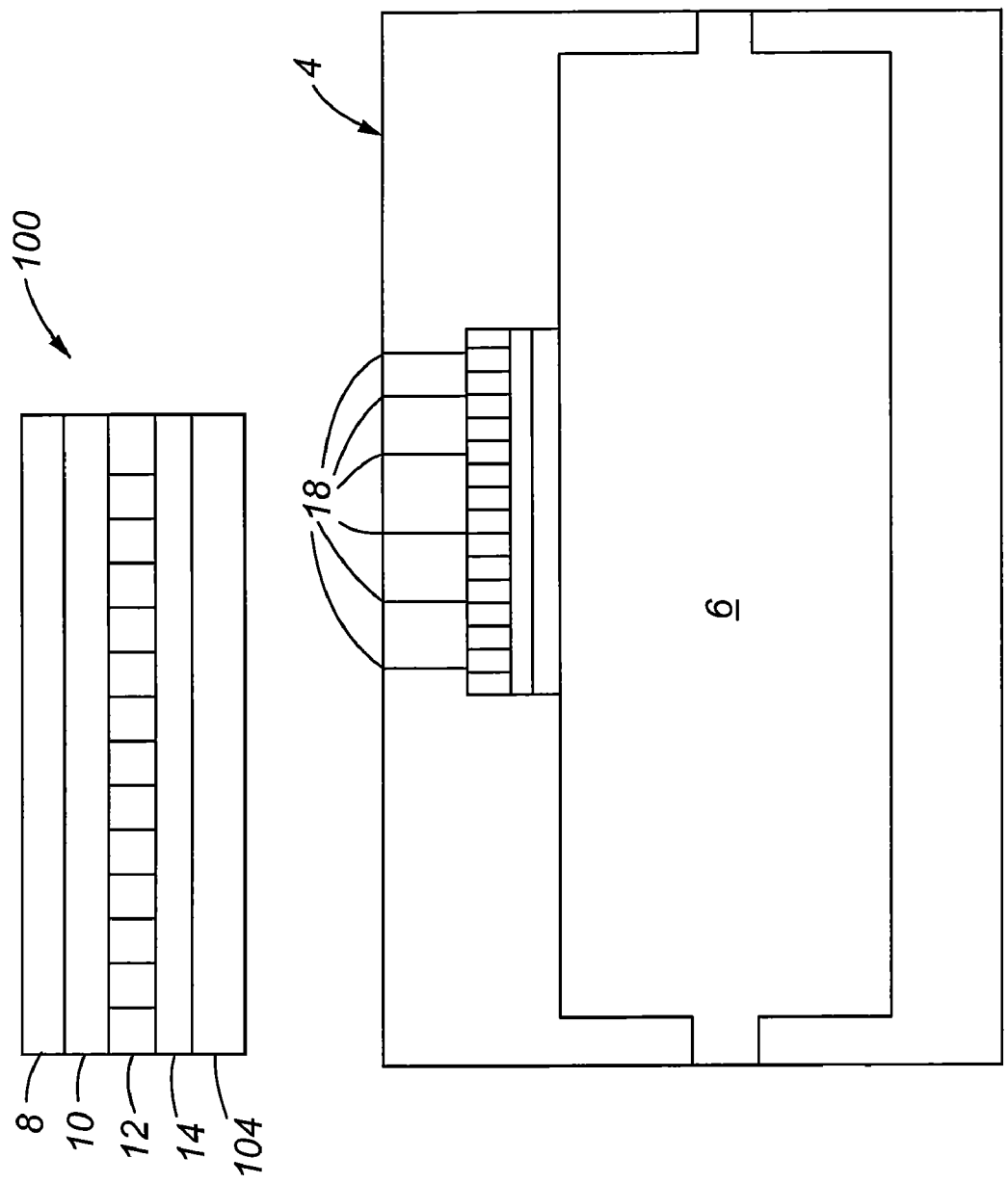
FIG. 6 is a side view of another embodiment of a flocked mold insert film according to the present invention.
FIG. 7 is a side cross-sectional view of a first configuration of a mold insert formed to accommodate the die of FIG. 6 in a closed mold.
Figure 8:
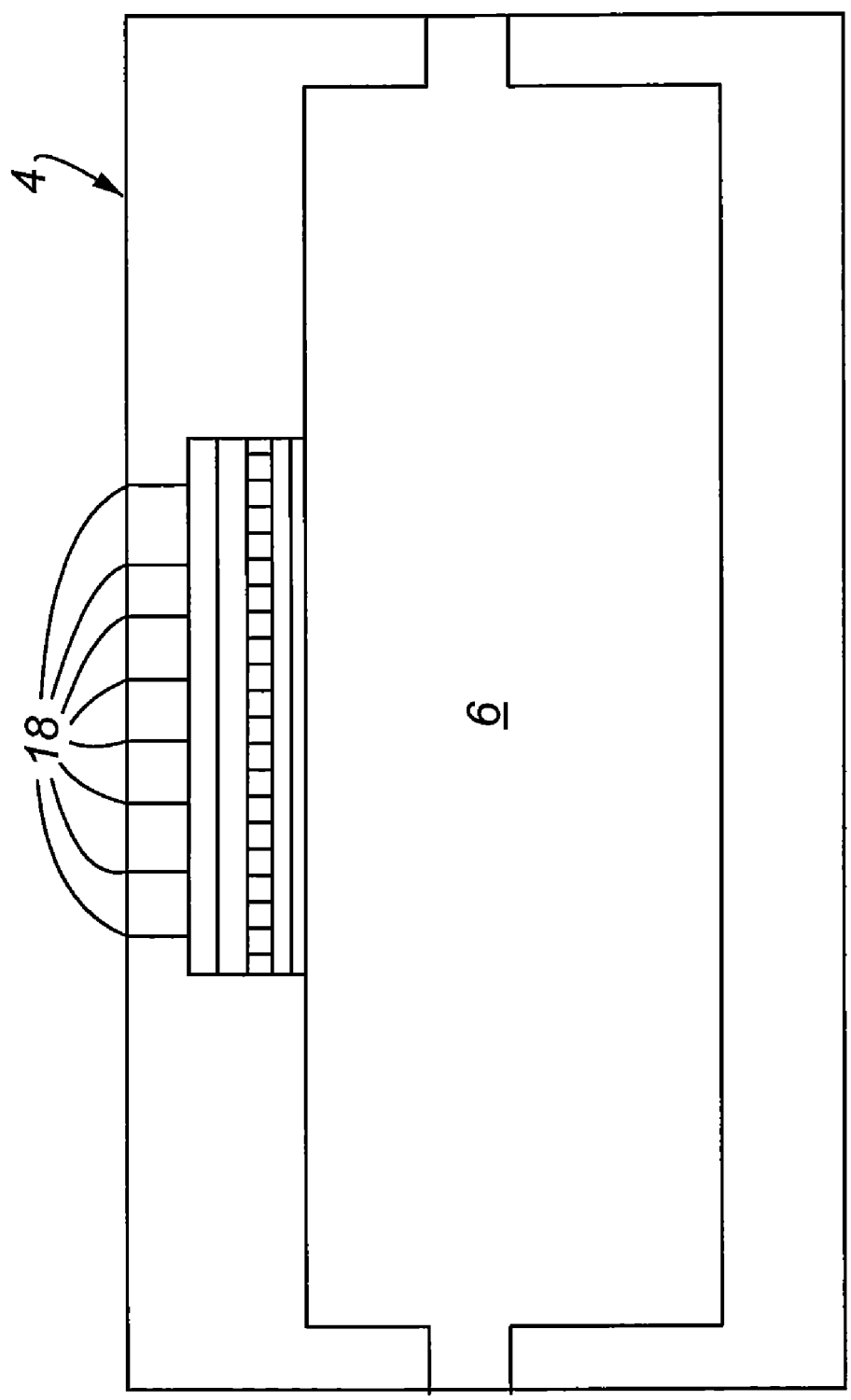
FIG. 8 is a side view of a second configuration of a mold insert formed to accommodate the die of FIG. 6 in a closed mold.

An embodiment of the invention using the transfer described in U.S. patent application Ser. Nos. 09/621,830 and 09/735,721 is shown in FIGS. 6-8. The transfer or mold insert film 100 in one configuration comprises a dimensionally stable (carrier) transfer carrier or sheet 8, a transfer release (temporary) adhesive 10, flock 12, a permanent adhesive 14, and a dimensionally stable substrate or backing film 104.

The sheet 8 can be any suitable transfer carrier that is formable and dimensionally stable with the flock. Examples of other types of suitable transfer carriers include plastic films. The sheet 8 is preferably a discontinuous sheet or a running web line material. The carrier sheet or film has surprisingly been found to assist in robotically feeding the mold insert or mold insert film into the forming tool and/or the mold itself. A vacuum is able to pick up the mold insert or mold insert film and transport and position the insert at a desired location in the forming tool/open mold. In the absence of a carrier sheet, as in the case of a direct flocked surface, a vacuum generally cannot be established by the vacuum suction cups with the flock due to air leakage through interstitial spaces between adjacent flock fibers. Other techniques to establish a vacuum connection include (i) the use of a discontinuous carrier sheet, where the carrier sheet is positioned to contact the vacuum suction cups but not in other adjacent areas where flock is exposed due to an absence of an overlying carrier sheet, and (ii) the use of a discontinuously applied or located flock surface, where no flock fiber is deposited in first region(s) to provide an exposed permanent adhesive or backing film in the first region(s) to contact the suction cups from the flocked side of the insert. Flock is deposited in one or more adjacent second region(s) where no vacuum suction cup is positioned.

As noted above, the release adhesive 10 is selected such that the bonding force between the release adhesive 10 and the flock 12 is less than the bonding force between the adhesive 14 and flock 12 on the backing film 104. In this manner, the sheet 8 and release adhesive 10 can be removed after lamination of the transfer without causing separation of the flock from the adhesive film 14 and backing film 104. Preferably, the melting point of the release adhesive 10 is greater than the maximum temperature realized by the injected resin in the mold (and the melting point of the resin) and more preferably greater than the maximum temperature realized by the release adhesive 10 during molding. As will be appreciated, for a cooled mold it is possible that the melting point of the release adhesive may be slightly less than the resin temperature.

Adhesive 14 can also be any suitable adhesive, with water-, UV-curable, and solvent-based adhesives being preferred. Preferably, adhesive 14 has a melting point that is greater than the maximum temperature realized by the injected resin in the mold (and the melting point of the resin) and more preferably greater than the maximum temperature realized by adhesive 14 during molding (which melting point may be less than the resin temperature for a cooled mold). Particularly preferred adhesives include hot melt thermoplastic and thermoset adhesives. As will be appreciated, thermoset adhesives solidify or set irreversibly when heated above a certain temperature. This property is usually associated with a cross-linking reaction of the molecular constituents induced by heat or radiation. Thermoset adhesives can include curing agents such as organic peroxides or sulfur. Examples of thermosetting adhesives include polyethylene, polyurethanes, polyamides, phenolics, alkyds, amino resins, polyesters, epoxides, and silicones.

As noted above, the flock 12 used in any of the processes discussed herein can be any electrostatically chargeable fiber, such as fibers made from rayon, nylon, cotton, acrylic, and polyester. Preferably, the flock has a melting and/or softening point that is greater than the temperatures experienced by the flock in the mold (which, conservatively, is no less than the maximum temperature of the resin during the molding process). Acrylic flock is therefore undesirable in many applications. The flock is also preferably resilient under the pressures experienced in the mold. Resilient flock, such as polyesters (e.g., poly(ethylene terephthalate) and other terephthalate polymers), and nylon flock, may matt down during molding but, after ejection from the mold, self-restore to its original orientation relative to the backing film. In most applications, the orientation is at least substantially orthogonal (perpendicular) to the surface of the backing film. An advantage of flock resiliency is the ability to compress the flock during molding to avoid "down-gauging" the wall thickness of the finished molded article. Compressible and less resilient flock is desirable in some applications, such as sublimation coloration or dying but would require additional process steps to restore the flock to its pre-mold orientation. Such post-molding processes include vacuuming the flock, mechanically brushing the flock, applying high voltages to the flock, heating the flock to high temperatures, and the like. Finally, it is preferable that the flock have high abrasion resistance and color fastness. Nylon and poly(ethylene terephthalate) flock is desirable due to its abrasion resistance and color fastness. In contrast, rayon flock, though resilient, is undesirable in certain applications due to relatively poor abrasion resistance and color fastness.

To provide interesting visual effects, the release adhesive 10 prior to deposition of the adhesive 14 can be coated with flock and/or other suitable design media (which is typically embedded in (or extends into) the adhesive 14). While not wishing to be bound by any theory, it is believed that the adhesive 14, upon application of heat and/or pressure, will melt, penetrate and surround the design media, and activate to form a strong bond. Suitable decorative media are selected so as to be stable at the temperatures experienced in the mold. Examples of design media other than flock include coatings, colors such as pigments or dyes, beads, metallic flakes, glitter, reflective material, inks, etc.

The dimensionally stable substrate or backing film 104 prevents dislodgment of the transfer from the desired position in the mold and flock from the adhesive 14 due to pressurized flow of the resin into the closed mold during resin injection. The backing film preferably has a melting point that is at or above the maximum temperature experienced by the backing film 104 in the closed mold (which is typically less than the melting point and maximum temperature of the resin) to provide a melt bond and tensile and compressive strengths and thermal stability sufficient to withstand the maximum pressures experienced in the closed mold without warping or shrinking. The softening point of the backing film is typically higher than the maximum temperature realized by the resin and backing film during molding. As will be appreciated, it is important that the resin 6 be chemically and physically (e.g., thermally) compatible with the substrate 104 to produce a strong melt bond between materials and thus an integral article after removal from the closed mold. Preferably, the substrate or backing film is a polymeric material and the polymers in the substrate 104 melt bond with the polymers in the resin 6. Exemplary backing films include monomers or polymers of styrene, acrylics, vinyls, olefins, cellulosics, carbonates, esters, polyester, polyethylene, polycarbonate, polypropylene, ABS, and mixtures thereof. A particularly preferred substrate for many resins is a polycarbonate. Thus, the film is able to withstand high pressure and high temperature without degrading, cracking, or melting.

The backing film is preferably nonwoven and neither a textile nor a fabric. Preferably, the backing film is in the form of a cast or extruded continuous film. Woven textiles and fabrics can resist forming into a three-dimensional or nonplanar shape due to the weave of the material.

There are several processes to manufacture the mold insert for the mold.

In one process configuration, a mold insert film 100 is formed by first depositing the flock 12 on the release adhesive 10 which is located on the sheet 8. The release adhesive 10 temporarily holds the flock in position on the sheet 8. The release adhesive and/or flock can be deposited over the entire surface of the sheet 8 or discontinuously over the sheet 8 in a desired pattern, as in the case of multiple colors of flock (each color is applied to the release adhesive in a desired pattern in separate steps with each pattern being nonoverlapping or disjoint). The sheet/release adhesive/flock assembly is then contacted with an adhesive film 14 and backing film 104 and laminated by thermal techniques to form the mold insert film. During lamination, the various layers are heated to a temperature sufficient to fully activate the adhesive 14. The mold insert film 100 can then be cut into desired shapes before or after the mold insert film is pre-formed into the mold insert as discussed below. This process can be continuous using a running web line.

In another process configuration, the mold insert film 100 is formed discontinuously by the following steps:

(a) applying the release adhesive 10 discontinuously to the sheet 8 (in a desired pattern) (which can be continuous over the sheet with later cutting in selected patterns, if desired);

(b) depositing the flock 12, such as by electrostatic techniques, on the release adhesive which is located on the sheet;

(c) heat applying the (permanent) adhesive 14 in a desired pattern (using a lower temperature to exploit the thermoplastic properties of the adhesive only without activating the thermoset (or fully cross-linking the adhesive) to form an intermediate transfer;

(d) cutting the intermediate transfer into desired shapes with a suitable cutting tool such as a kiss-cutting steel rule or laser cutter;

(e) removing or "weeding" unwanted portions of the intermediate transfer;

(f) laminating the sized sheet/release adhesive/flock/adhesive transfer to the backing film 104 using conditions (time, temperature, and pressure) sufficient to fully activate the (permanent) adhesive and permanently attach the intermediate transfer to the backing film 104 to form the mold insert film 100. At this stage the residual randomly oriented flock fibers remaining in the release adhesive (e.g., the flock fibers poorly bonded or not bonded to the backing film) will prevent the sheet and release adhesive from leaving marks on the mold insert film 100. Alternatively, the sheet 8 could be removed firstly and replaced with a clean carrier sheet 8 free of randomly oriented, remaining residual flock fibers.

(g) removing the sheet 8 from the mold insert film 100, leaving the fiber image on the mold insert film 100 in the desired areas (e.g., the design is discontinuously distributed over the surface of the film backing).

In any of the above processes, another adhesive film 208 (FIG. 9) can be concurrently or later bonded to the adhesive film 14. The assembly is then bonded to the backing film 104. When the adhesive film 14 is fully activated during lamination, it is unable to later attach to the backing film 104. The adhesive film 208 is used to permit the assembly to be bonded to the backing film 104. Adhesive films 14 and 208 can be any suitable adhesive, with activatable adhesives, such as hot melt thermoplastic or thermoset adhesives, being preferred.

In one configuration, the backing film 104 is planar during lamination.

The mold insert film 100 of FIG. 6 can be formed into a 3D mold insert. This can be done by known techniques using heat and/or pressure and/or other forming techniques. Preferred forming techniques include thermoforming, e.g., reforming, vacuum forming, hydro-forming, etc. The mold insert can be cut to size for precise placement into the mold.

The dimensionally stable sheet 8 may be removed from the mold insert film/mold insert after bonding to the substrate and before location of the transfer in the mold or prior to pre-forming of the mold insert. The latter process configuration is commonly employed as the transfer has a relatively low profile or thickness which can be important for molded articles having thin wall thicknesses. If the sheet 8 is left on the transfer when placed into the mold, the mold-contacting side of the sheet may include a pressure sensitive adhesive as noted above with reference to the transfer 2.

When the mold insert is placed into the mold, the mold insert preferably fits precisely into corresponding extensions or recesses of the main mold cavity (e.g., dams such as FIGS. 3 and 4 and/or a recess such as in FIG. 1) and the mold insert held in place during molding by suitable techniques such as pins, vacuum, etc. Alternatively, the mold insert could be positioned in a mold which does not have the corresponding cavity extensions as in FIG. 2. This could produce a result quite different than the result realized when cavity extensions are employed. Namely, the fibers could stand less proud of the molded article and would be recessed, inset, or flush with the surface of the solidified resin.

After the mold insert is positioned in the mold, the mold is closed and molding conducted as set forth previously. After molding, the flock fibers typically stand proud of the exterior surface of the molded article.

Figure 9:
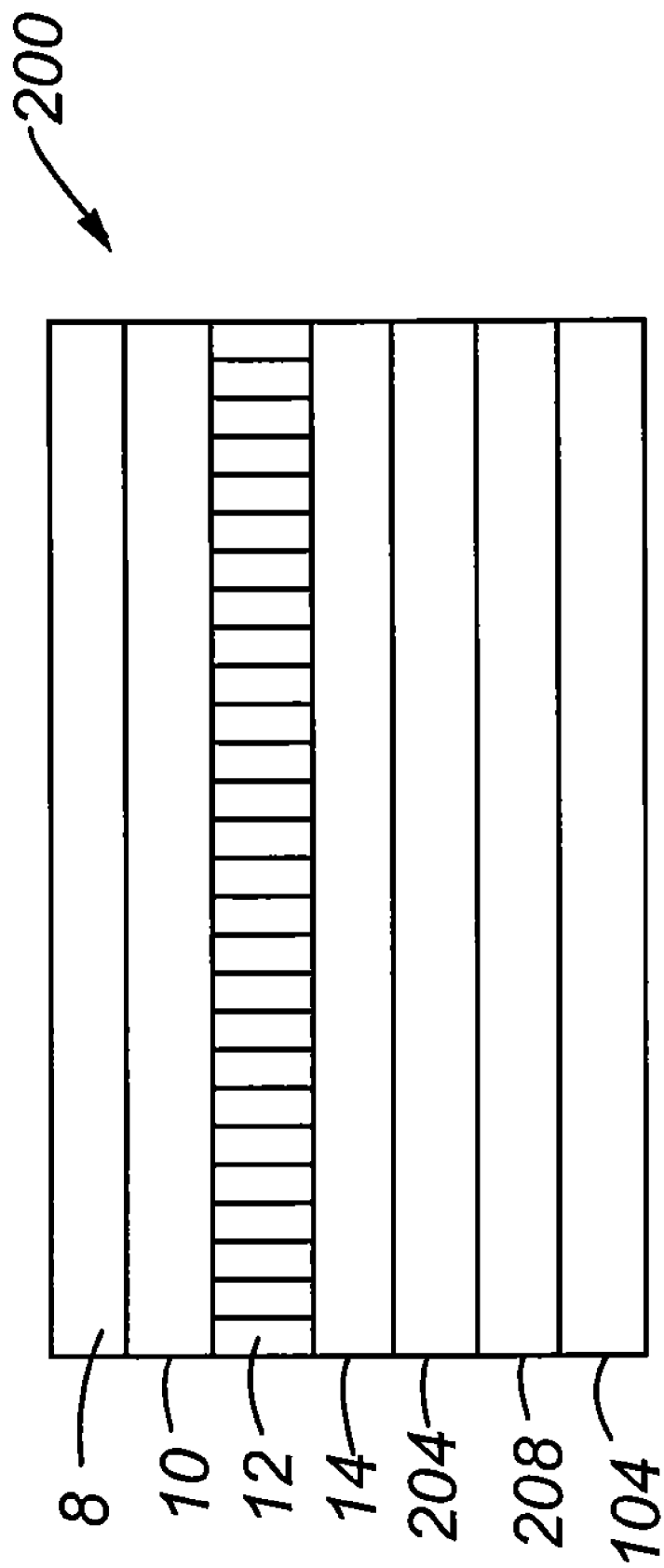
FIG. 9 is a side view of yet another embodiment of a mold insert film according to the present invention.

Referring to FIG. 9, the mold insert film 200 can include a barrier film 204 positioned somewhere between the flock 12 and the substrate 104. In one configuration, the film 204 is positioned between the flock 12 and the adhesive 208. Another suitable adhesive 14 (such as the adhesives noted above) is used to attach the flock 12 to the film 204.

The barrier film 204 can perform a number of differing purposes. For example, the barrier film can be selected to provide a desired coloration to the transfer, e.g., opacity, when viewed by a customer. The barrier film 204 could also be used to provide a desired color in areas where flock is intentionally omitted. This can produce a 3-D appearance to the viewer. Examples of film compositions for this objective include decorative media such as a textile, glitter, reflective glass, beads and etc. The film 204 can be selected to provide desired physical properties to the mold insert film. For example, the film 204 can have high tensile and compressive strengths and a low modulus of elasticity to provide rigidity or a high modulus of elasticity to provide elasticity. This can give an mold insert film superior resistance to handling before and during attachment to the substrate 104 and/or more elasticity and therefore more forgiveness or tolerance if the mold insert film is not sized properly relative to the substrate 104. Examples of film compositions for this objective include (foamed) rubber and polyurethane. The film 204 can act as a barrier film to migration of the resin 6 and/or adhesive 208 into the flock 12. Examples of film compositions for this objective include plastics having a melting point higher than the maximum temperatures in the mold and metal foils. The film 204 can have a low thermal conductivity (or be thermally insulative) to provide a thermal barrier to protect the adhesive/design media located above the film from the high molding temperatures. Examples of film compositions for this objective include fiberglass, asbestos, silica, and teflon.

In another embodiment of the invention, a method is provided that comprises the steps of permanently fiber coating (e.g., direct flocking) an adhesive coated backing film, inserting the fiber-coated film backing into the mold, molding the article, cooling the mold, and removing the flocked article from the mold. The method can additionally comprise an additional step of pre-forming the backing film into a mold insert, after permanently fiber coating the backing film, to mate with the shape of the mold. While molded articles produced by flock transfer inserts produce excellent molded articles, there is a time and cost factor associated with using transfer inserts to produce the flocked molded articles. In addition, molded articles produced by flocked transfer inserts also have a certain thickness to the insert that is associated with the use of the transfer carrier media or certain direct flock adhesives such as latex adhesives. There are many applications, however, that require an extremely thin profile to permit satisfaction of the wall thickness and strength specifications of the molded article. Thus, there exists a need to reduce the time and cost factors by eliminating the use of the transfer inserts and producing a molded article through direct flock insert methods and technology.

This embodiment of the invention is surprising and unexpected to those skilled in the art. It is generally believed that direct flock insert techniques would not be preferred in a mold since the temperatures and pressures to which the insert is subjected during the molding process are extreme. It is generally believed that such extreme process characteristics could damage and/or disorient the flock. The adhesive holding the flock to the backing film may become tacky after being inserted into the mold and when under the pressures present in the mold thereby causing matting and/or disorientation of the flock. This can result in an undesirable appearance or feel or texture of the molded article.

Notwithstanding the foregoing, the present invention provides a plush, evenly-coated, three-dimensional textured decoration molded article using direct flock insert techniques without the use of transfer carrier media. The present invention, in its completed form, comprises flock which is typically directly and permanently embedded in an adhesive deposited on the backing film 104 and a solidified resin 6 which is applied in a flowable form directly to the backing film 104 opposite the flocked side of the mold insert. It is contemplated that this invention can be multicolored and also utilize non-compatible design media, such as the media noted above.

The article of the present invention is superior to conventional molded articles using textiles. The differences between a flocked mold insert and a textile mold insert are substantial. A textile is typically (woven or knit) continuously constructed and has a plurality of connected, intermingled, and/or physically overlapped fibers in a multiplicity of transverse, crisscrossed orientations. The disorganized and transverse orientations of the fibers in the textile can have the appearance of a bird's nest. In contrast, a flocked mold insert, due to the precise electrostatic deposition of the fibers, typically has the fibers in parallel orientations perpendicular to the substrate. The fibers typically are at least substantially orthogonal to the planar surface of the backing film. The highly organized density of the fibers provides a plush feel and an attractive appearance. In a flocked mold insert, the fibers can also move independently of one another during the forming process or when being formed or dimensionalized.

Figure 15:
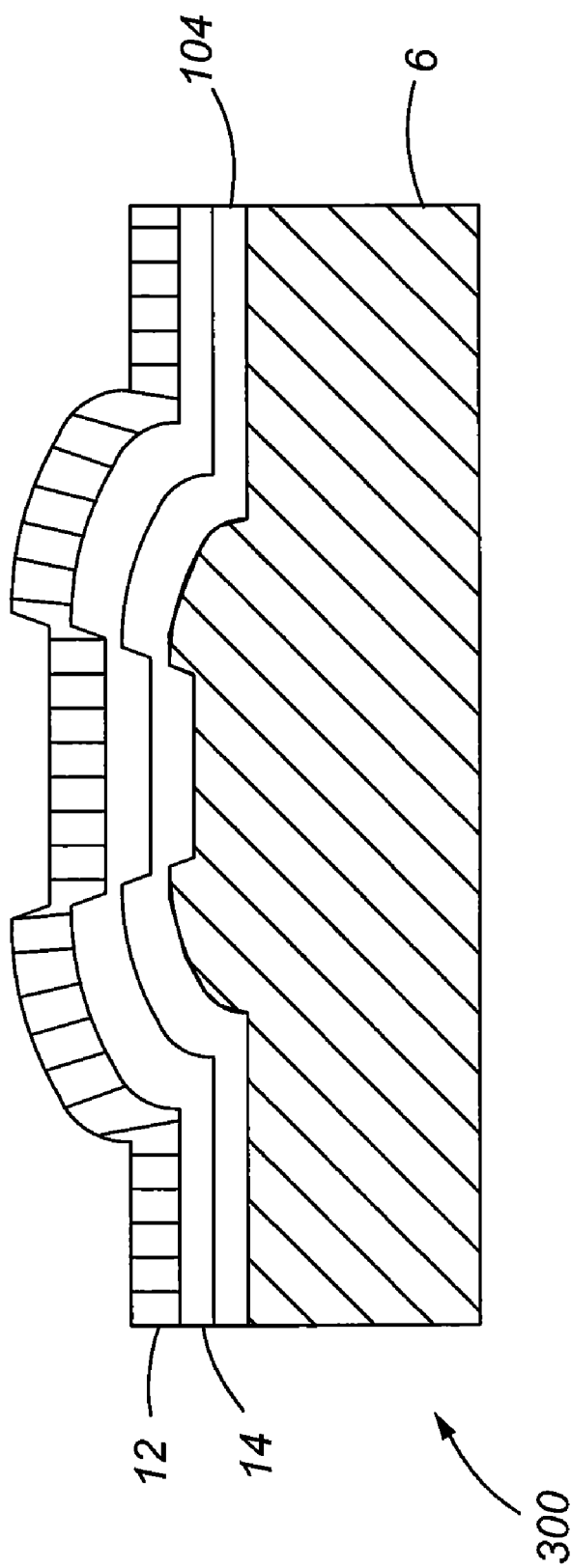
FIG. 15 is a side view of a finished molded article from the mold of FIG. 14.

As shown in FIG. 15, the direct flocked insert article 300 or mold insert film comprises the film backing 104, adhesive layer 14, flock 12 and solidified resin 6. The adhesive layer 14 can be any suitable adhesive, such as a water-, UV-curable, dispersion-, or solvent-based adhesive. Particularly preferred adhesives comprise hotmelt thermoplastic or thermoset adhesives or other types of thermally or UV activated adhesives. As noted above, the film backing 104 is made of a dimensionally stable material that is stable under conditions which meet, or preferably which exceed, the normal operating thermal and pressure characteristics that are typical in the use of molds and are formable (such as by vacuum or hydro-forming) into desired shapes and otherwise suitable for the finished molded product. Suitable film backings include but are not limited to the materials described above with polycarbonates being particularly preferred.

The process to manufacture the article will now be described.

Figure 10:
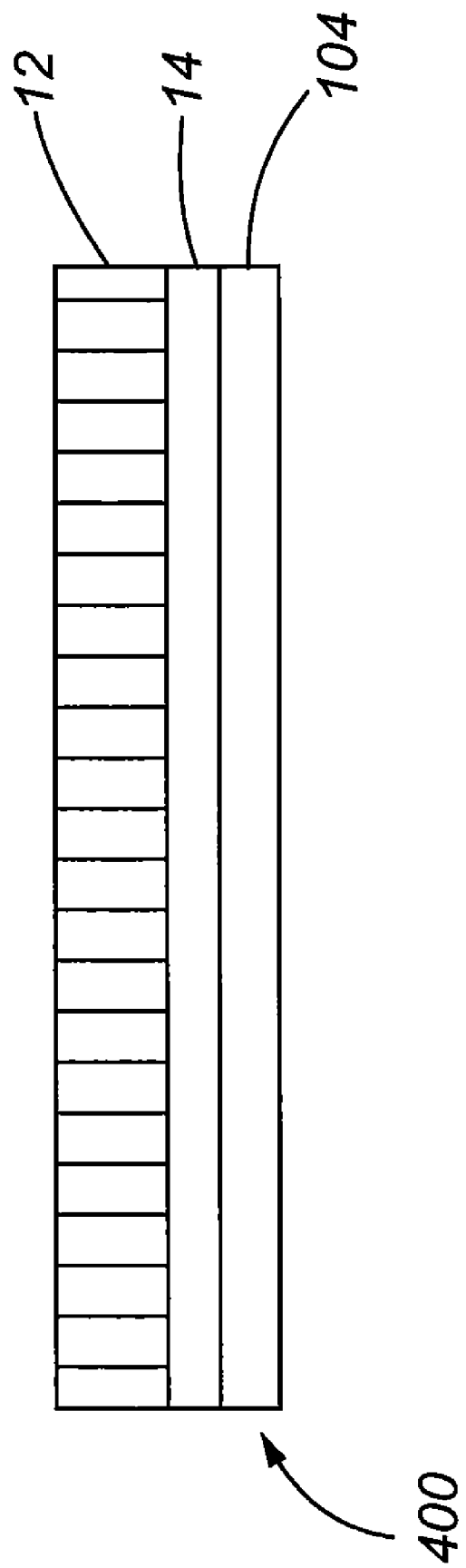
FIG. 10 is a side view of yet another embodiment of a mold insert film according to the present invention.
Figure 11:
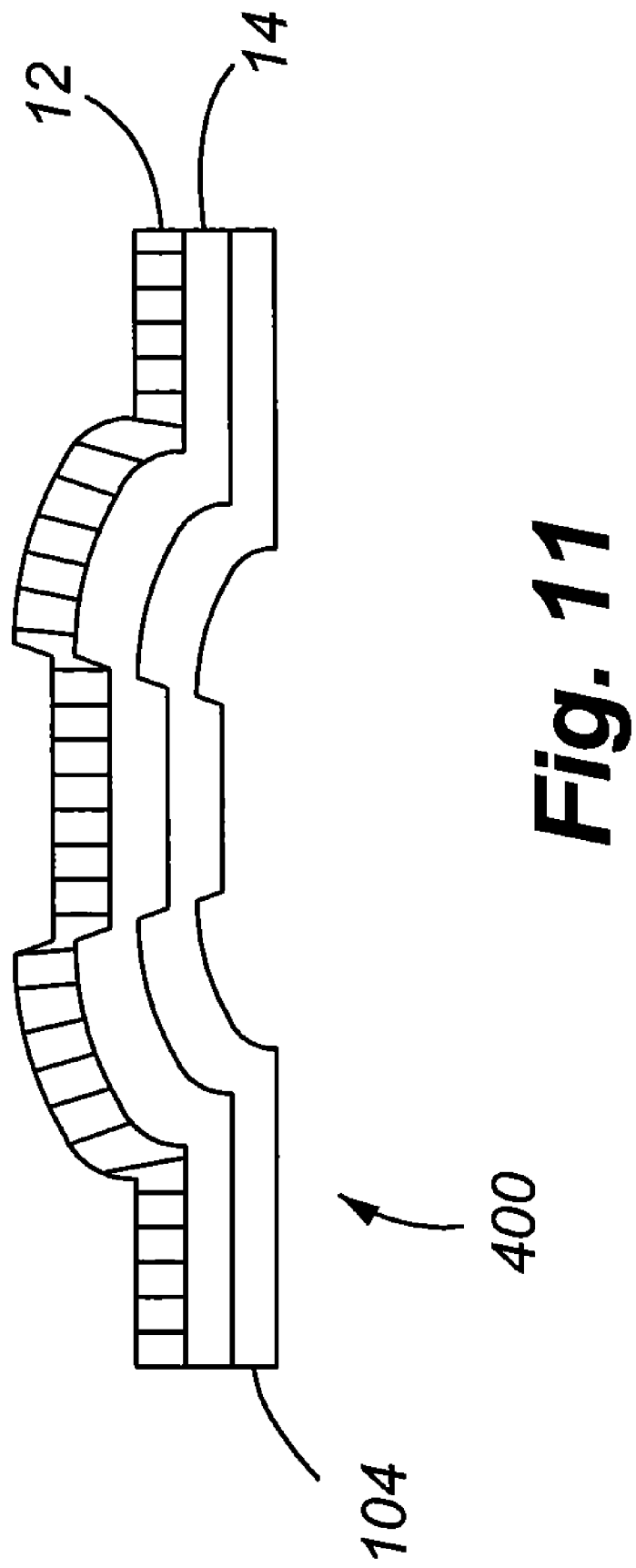
FIG. 11 is a side cross-sectional view of a mold insert pre-formed to fit the mold of FIG. 10.

As shown in FIGS. 10 and 11, the initial steps in making the article are to manufacture a mold insert 400 comprising the backing film 104, adhesive layer 14, and flock 12 for later placement in the mold 4 in FIG. 14. The mold insert 400 is made by applying the adhesive layer 14 to the backing film 104 and then applying the flock 12 to the backing film 104 by known techniques. For example, the flock 12, or discontinuous particle material, is applied directly to the backing film 104 by conventional direct flock techniques such as those described in U.S. Pat. No. 3,793,050 to Mumford, the entirety of which is incorporated by reference herein. As will be appreciated, the flock 12 is typically a series of discrete synthetic fibers capable of independent movement during deposition onto the backing film. Typically, the backing film is planar during the flocking process. This helps ensure that the flock is evenly distributed over the surface of the backing film. Of course, the flock can be placed on a non-planar backing film. However, the planar surface is preferred so that there are no ridges or undulations to mar the flocking. In such techniques, electrostatically charged particles may be passed through one or more screens to form a multi-colored design on the electrically charged backing film. The substrate 104 is electrically grounded so as to attract the charged flock fibers.

Figure 12:
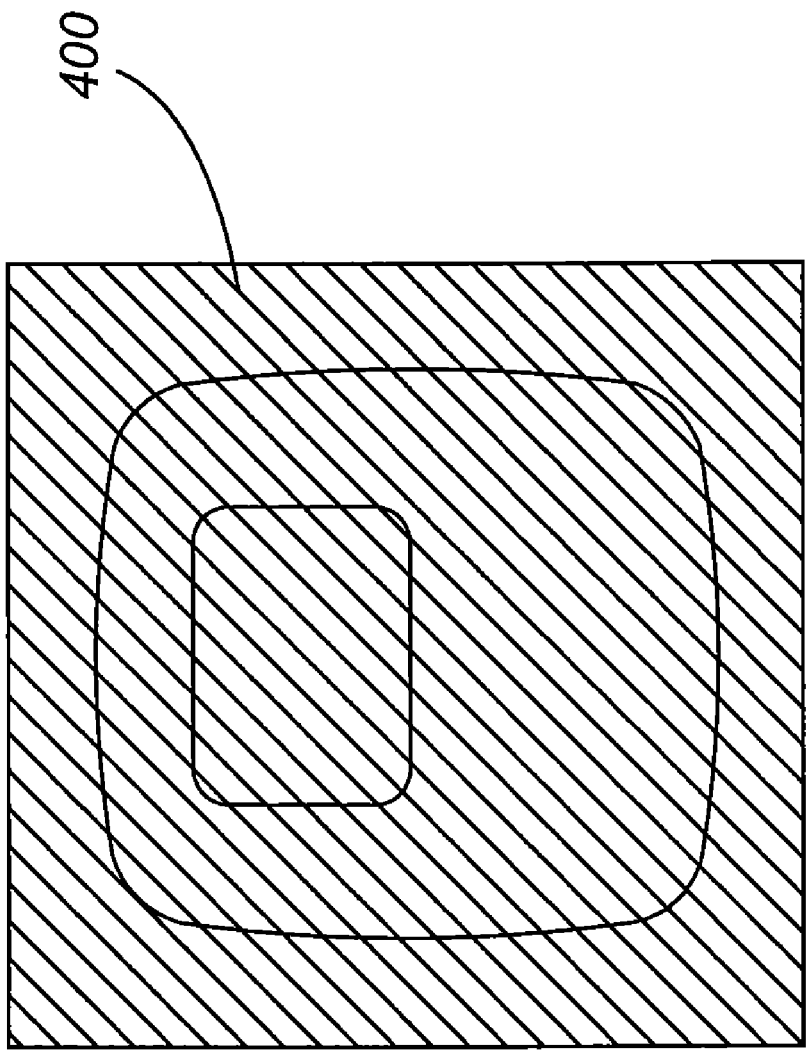
FIG. 12 is a top view of the mold insert of FIG. 9.
Figure 13:
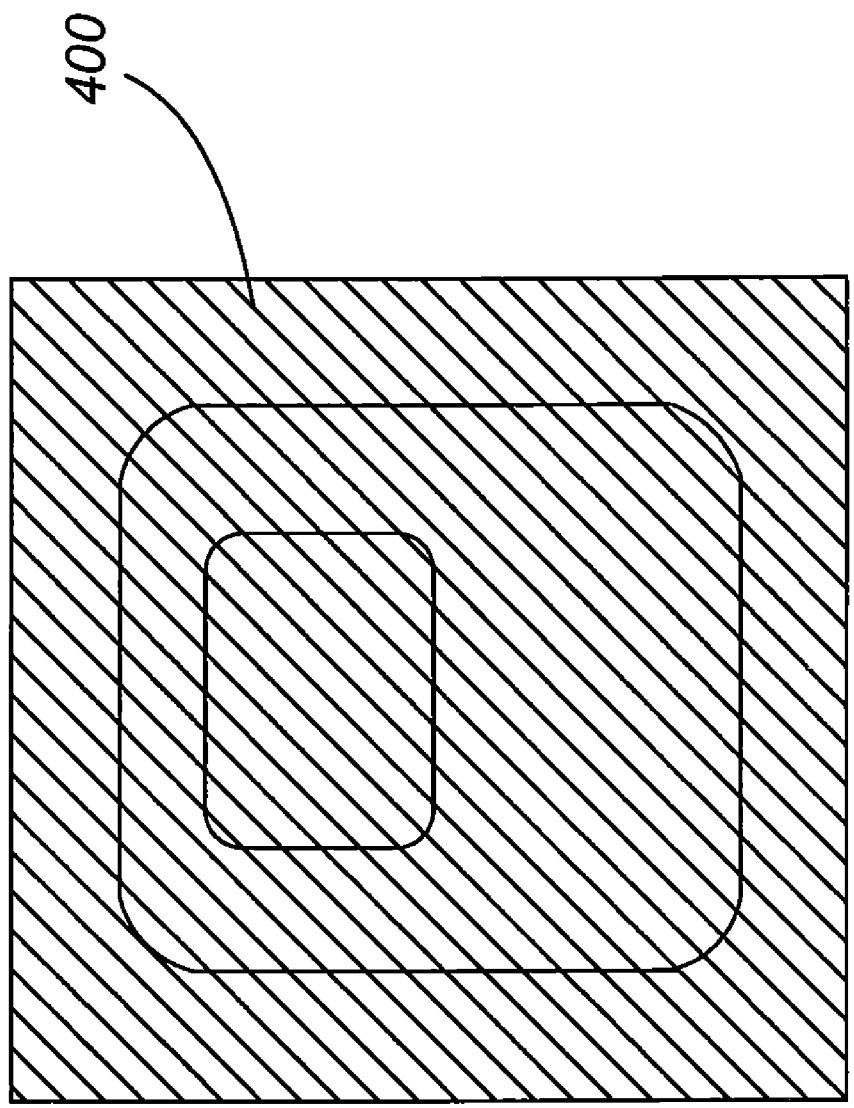
FIG. 13 is a bottom view of the mold insert of FIG. 9.
Figure 14:
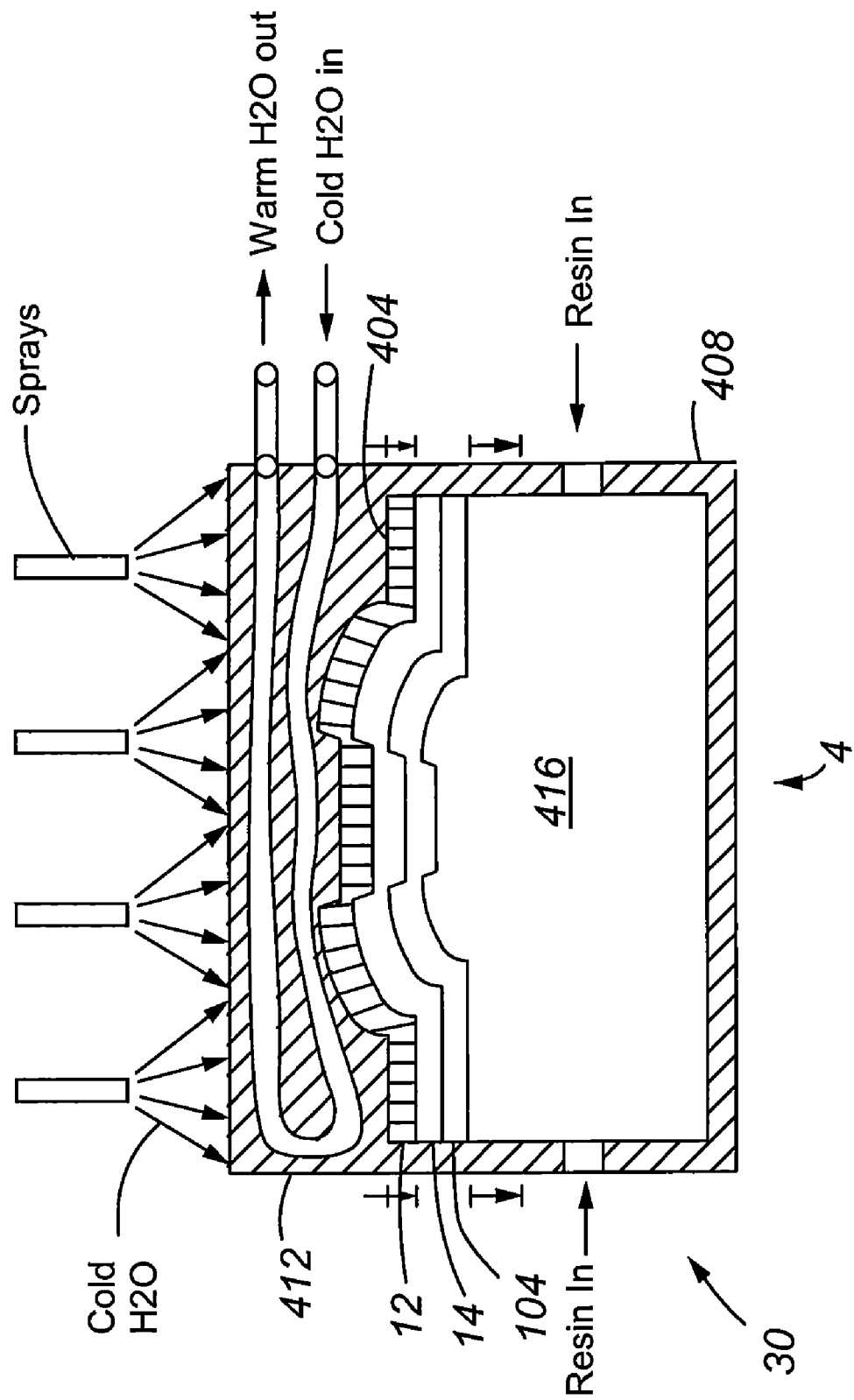
FIG. 14 is a side cross-sectional view of the pre-formed mold insert of FIG. 11 in a closed mold.

As shown in FIGS. 11 and 14, the flocked backing film can be modified, such as by vacuum and hydro-forming techniques, to form a three-dimensional shape or mold insert 400 and mate with a surface of the mold 4 as shown in FIG. 14. The modified flocked backing film has self-aligning or self-locating properties since the three-dimensional shape corresponds to (is a male and/or female counterpart of) the mold surface 404 with which the mold insert engages. In this embodiment, heat and/or pressure and/or vacuum or any other forming process are applied to the flocked backing film to form alternatively a male and/or female counterpart or mold insert to be received in the mold. FIGS. 12-13 show the top and bottom portions of such a modified flocked mold insert film. The mold insert film can be designed to cover the entirety of the mold or to cover only a portion of the mold. If only a portion of the mold is covered by the flocked insert film, the insert film should be self-locating so that the flocked insert film is aligned or located in the correct portion of the mold. As will be appreciated, the mold insert can be held in place in the mold during the molding process by mechanical or other means.

In the next steps in the manufacturing process, the article is injection molded using the mold insert 400 and mold 4. Referring to FIG. 14, the mold insert 400 is placed in one of the parts of the mold, the mold closed, and flowable resin introduced into the mold by known techniques. The backing film 104 prevents the resin from contacting the fibers and provides a melt bonding surface for the resin as it solidifies. As noted above, the mold is cooled by known techniques to cause solidification of the resin.

By way of illustration after the mold is closed, molten resin is inserted into the cavity 416 defined by upper and lower parts 412 and 408 of the mold 4 according to one of the molding techniques described above or any other technique known to those of skill in the art. During the molding process, it should be clear to one of skill in the art that the temperature of the backing film is greater than the temperature of the flock since the flock is contacting the cooled portion of the mold. The resin is then cooled forming a melt bond with the backing film and resin and, once cooled, the insert flocked molded article is removed. During the cooling process, the backing film temperature will gradually decrease until the temperature of the cooled portion, the flock, the backing film and the resin stabilize and solidify. The flock that is now permanently affixed to the molded article is not matted or degraded in any way but has a plush feel. Molded articles with three-dimensional flocks can also be produced using direct flock insert techniques without degrading or changing the desired three-dimensional shape. While not wishing to be held to any particular theory, it is believed that the flock holds its shape and texture because it is adjacent to and receives the benefit of the cooling of the cold portion of the mold. The flock and backing film are also surprisingly resistant to the heat and pressures experienced in the mold.

As shown in FIG. 14, typical molds 30 for molding parts have two or more parts (tool/die), the cooled lower part 408 where the molten resin will be placed (or with which the molten resin will be contacted) to form the part and a cooled upper portion 412 which has the desired shape of the part. Both parts are constantly cooled by any suitable technique, such as heat transfer or exchange techniques, to assist in the cooling process of the resin. A particularly preferred technique is to circulate a cooling fluid, such as water, through the upper and/or lower parts 408, 412 of the mold. Thus, when the flocked mold insert is inserted into the mold, the mold insert will fit exactly into the shape of the upper part 412 of the mold. As will be appreciated, other suitable types of molds may be used to form the molded article.

Notwithstanding the foregoing, transfers, though generally more expensive, may be preferred over direct flock insert techniques in certain applications. Direct flocked insert articles can suffer from disoriented and loose fibers that can become free during later processing steps and cause problems, particularly in manufacturing electronic products. Transfers, by virtue of the release sheet (which removes disoriented and loose fibers), have a lower incidence of fibers becoming loose in later processing steps, such as trimming or cutting. As will be appreciated, a sheet having a release adhesive can be applied to a direct flocked article to remove the loose fiber but at an additional expense.

Figure 17:
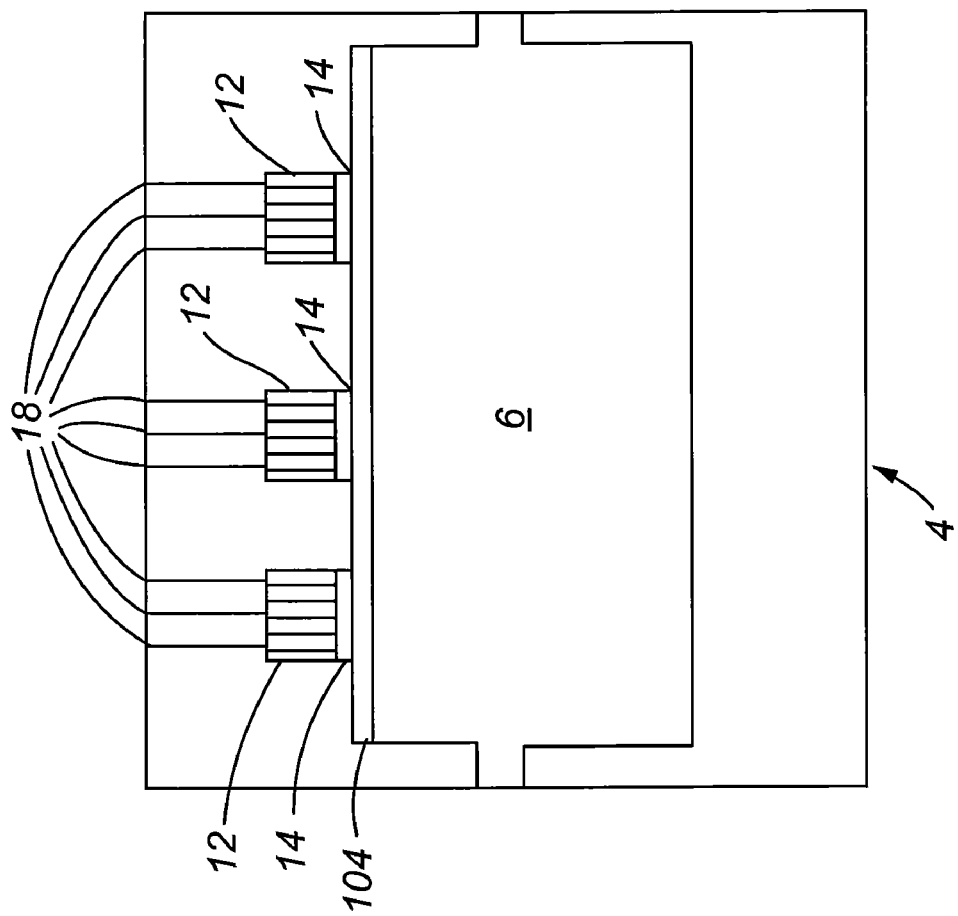
FIG. 17 is a side cross-sectional view of the mold insert of FIG. 16 positioned in a closed mold.
Figure 16:
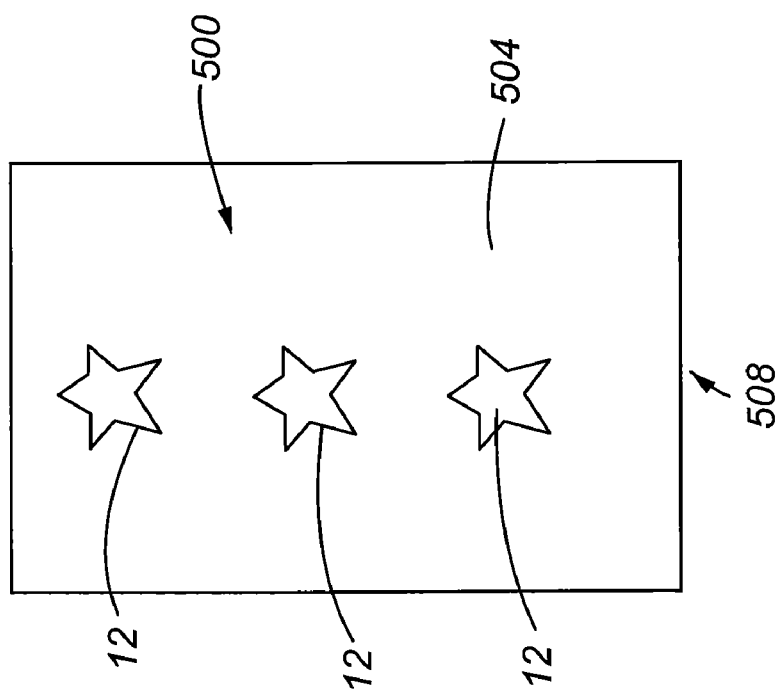
FIG. 16 is a top view of a mold insert according to another embodiment of the present invention.

FIG. 16-17 depict a discontinuously distributed flocked design that is realizable using any of the above described techniques. The flocked design 500 is located on only a portion of the exterior surface 504 of the molded article 508. The portion of the exterior surface 504 can be free of a decorative media or contain decorative media other than flock.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

In one alternative embodiment, the adhesive 14 used in direct flocking inserts is a resin dispersion. As will be appreciated, a "resin dispersion" is a dispersion of one or more resins in one or more plasticizers or other additives, which forms a liquid or paste that gels and/or fuses when heated. A resin is an organic polymeric liquid that, when converted to its final state for use, becomes solid. The resin dispersion thus typically includes fine particles of polymers or copolymers and plasticizer(s). The resin dispersion can further include stabilizers, fillers, thickeners, curing agents, etc. The resin dispersion is typically dried and cross-linked with chemical reactions and/or heat.

Preferred resin dispersions include vinyls, such as PLASTISOL™, urethanes, nylons, acrylics, acetates, polyesters, and/or olefins. "Vinyls" refer to a compound including the vinyl grouping ($CH_2$---CH--) or a derivative thereof; "urethanes" to a compound including the grouping $CO(NH_2)OC_2H_5$ or a derivative thereof; nylons to a compound having the grouping —CONH or a derivative thereof; acrylics to a compound including the acrylonitrile grouping or a derivative thereof; acetates to an ester of acetic acid where the substitution is by a radical; and olefins to a class of unsaturated aliphatic hydrocarbons having one or more double bonds. As noted, the resins in the resin dispersion typically include polymers of the foregoing compounds. Such resin dispersions, though having a low melting temperature, may be usable for low temperature molding techniques.

The resin dispersion is applied to the insert backing film 104 in desired patterns, such as by screen printing of the resin dispersion. The flock 12 will adhere to the backing film 104 only where the resin dispersion is deposited, permitting the formation of novel and attractive free-standing designs. When a resin dispersion is used as the adhesive 14, the resin dispersion and attached film insert backing are heated or cured, such as in an infrared dryer, to a temperature at or above the gel temperature of the resin dispersion for a time sufficient to pass through both the gel stage (in which the resin dispersion partially solidifies or begins to solidify) and the fusing stage (in which the resin dispersion fully solidifies). Typically, once the resin dispersion is fused the resin dispersion will not melt at the temperatures experienced in the mold.

As will be appreciated, the gel temperature or gel point is the temperature at which the resin dispersion starts to become a solid. The gel point of a resin dispersion determines how fast the resin dispersion will flash at a given thickness.

The fusion temperature of a resin dispersion is that temperature necessary to completely fuse the resin dispersion. This temperature is typically dictated by the resins and plasticizers in the formulation and is typically (320)(dwell or residence time)° F./160° C. Typically, the heating temperature is at least about 340° F. and more typically ranges from about 320° F. to about 370° F. The residence time is typically at least about 0.5 minute and more typically ranges from about 1 to about 3 minutes.

In yet another embodiment, any number of molding techniques are employed. As will be appreciated, "molding" normally refers to creating a plastic or rubber article in a desired shape by application of heat and/or pressure, either in a negative cavity or in contact with a contoured metal or phenolic surface. Exemplary molding techniques that can be used with the present invention include but are not limited to high pressure injection molding, gas-assisted injection molding, fusible core injection molding, low pressure injection molding (including laminate molding and liquid-gas assist molding), advanced blow molding, blow molding, compression molding, thermoplastic sheet composite processing, reactive liquid composite molding, microcellular plastics, lamellar injection molding, and multimaterial, multiprocess technology, rotational molding, co-injection, in-mold decoration, encapsulation, stack molding, micro-injection molding, fusible core, vibration-assisted, injection molding extrusion, surface replication, direct compounding, vacuum forming, transfer molding, or any combination thereof. The finished plastic part need not be a flat plane, but by virtue of the flexibility of the flock transfer may be rounded, or portions of the part may be raised.

In other embodiments, the flock used in any of the above processes is a printable flocking material. Typically, the flocking material is a white polyester or other synthetic fiber. A suitable ink or pigment is then applied to the decorative insert media to cause dying or coloration of the insert media after application to the underlying (or overlying) layer (depending on the order in which the various layers are deposited). Flock coloration techniques include the use of sublimation inks (as noted above), acid dye inks, and pigment inks.

Sublimination is often a preferred technique to provide desired color patterns to the design due to the more superior feel of the design. The colored fibers in the design have a softer feel than fibers colored using other techniques. A softer feel is more attractive to consumers in many applications. The ink is more colorfast on the fiber as the ink is absorbed by the fiber as opposed to simply being a surface coat on the fiber. Non-sublimation inks, such as acid dye inks, generally must be cured after application, such as by steam curing (which can be impractical and cumbersome).

Other methods of coloring the flock include inkjet printing and other printing techniques. Inkjet printing is particularly attractive. When combined with the various flocking/molding techniques set forth above, it is possible to obtain a wide format design inexpensively and in high volumes. Such designs are particularly attractive when combined with highly resilient flock.

In other embodiments, the above techniques are used with other deposition techniques. For example, the various layers can be deposited by sheet fed processing methods or continuous webline-type processing. In one process configuration, the adhesive is deposited using a small coating machine (e.g., a roller coater, knife-over-roll, etc.). The decorative media can then be applied by any suitable technique mixed media typically is separated by physical imaging techniques such as by screen printing, by using mold inserts, by using templates, and the like.

In yet another embodiment, the decoration on the molded insert article is dimensionalized such as by a foam backing material located beneath or as part of the decoration. There are several techniques of applying the foam backing material. First, the backing film can itself be or be configured as a composite including a foam material. Second, the adhesive film 14 (FIG. 1) or 208 (FIG. 9) can include one or more commonly used blowing agents. When the adhesive film is heated, the blowing agent will produce a gas, which will cause the resin film to form an open and/or closed cell foam structure. In either event, the mold insert is preferably received within a suitable sized recess such as shown in FIGS. 1 and 17 to provide the foam backing material room in which to reside and/or expand.

In yet another alternative embodiment, the backing film may be omitted, such as from a transfer. In this embodiment, the transfer is positioned in the mold, and resin is introduced into the mold at a low pressure and/or flow rate to avoid damaging or dislodging the transfer. The flow rate is controlled by resisting resin flow into and through the mold using a compressible fluid such as a gas (a "gas assist" process). In other words, a compressible fluid is introduced into the mold prior to or during resin injection, and the pressure of the fluid adjusted dynamically to produce a desired rate of resin flow into and through the mold. Typically, the resistant pressure exerted by the compressible fluid on the resin is around 200 psi. This process can be implemented using technology known as the INTELLIMOLD™ process.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
providing a mold insert comprising a plurality of flock fibers, a permanent adhesive layer, and a dimensionally stable backing film, wherein the backing film is affixed to the permanent adhesive layer, wherein the permanent adhesive layer is affixed to an opposing second surface defined by the flock fibers, and wherein the mold insert is non-planar;
positioning the mold insert in a mold, wherein the mold insert fits into an extension and/or recess in a mold, thereby preventing dislodgment of the mold insert due to an introduction of a resin; and
introducing the resin into a cavity of the mold, such that a resin contacts the mold insert and the backing film is melt compatible with and forms a melt bond with polymers in the resin to form a molded article, wherein a melting point of the permanent adhesive layer is greater than a temperature of the resin during the introducing step.

2. The method of claim 1, wherein a release sheet is affixed to a first surface defined by the flock fibers.

3. The method of claim 2, wherein neither the permanent adhesive nor the backing film is a fabric to permit the mold insert to be formed into a three-dimensional shape.

4. The method of claim 1, wherein the permanent adhesive is a thermoset adhesive selected from the group consisting of polyethylene, polyurethane, polyamide, phenolic, alkyd, amino resin, polyester, epoxide, silicone, and mixtures thereof, wherein the mold insert is free of a hot melt adhesive, and wherein the plurality of flock fibers are free of acrylic.

5. The method of claim 4, wherein the permanent adhesive is fully activated before positioning of the mold insert in the mold.

6. The method of claim 1, wherein the permanent adhesive is a thermoplastic adhesive selected from the group consisting of polyethylene, polyurethane, polyamide, phenolic, alkyd, amino resin, polyester, epoxide, silicone, and mixtures thereof and wherein the plurality of flock fibers are free of acrylic.

7. The method of claim 1, wherein the permanent adhesive layer is a cast, continuous film selected from the group consisting of polyethylene, polyurethane, polyamide, phenolic, alkyd, amino resin, polyester, epoxide, silicone, and mixtures thereof and wherein the plurality of flock fibers are free of acrylic.

8. The method of claim 1, wherein the permanent adhesive layer is an extruded, continuous film selected from the group consisting of polyethylene, polyurethane, polyamide, phenolic, alkyd, amino resin, polyester, epoxide, silicone, and mixtures thereof and wherein the plurality of flock fibers are free of acrylic.

9. The method of claim 1, wherein melting and softening points of the flock are no less than and a melting point of the permanent adhesive layer is greater than a maximum resin temperature in the mold.

10. The method of claim 1, wherein the mold insert is formed by direct flocking techniques.

11. The method of claim 1, wherein the mold insert is a transfer comprising a release sheet adhered by a release adhesive to a first surface of the flock fibers and wherein the permanent adhesive is adhered to a second surface of the flock fibers, the first and second surfaces being in an opposed relationship.

12. The method of claim 2, wherein the permanent adhesive layer is positioned between the flock fibers and the backing film.

13. The method of claim 12, wherein the plurality of flock fibers are oriented at least substantially perpendicular to an adjacent surface of the permanent adhesive layer.

14. The method of claim 12, wherein the backing film is a cast or extruded continuous film and further comprising before the positioning step:
contacting the plurality of flock fibers and permanent adhesive to the backing film to form a substantially planar assembly; and
thereafter forming, by thermoforming, reforming, vacuum forming, and/or hydro-forming the assembly into the mold insert into a three dimensional, non-planar shape.

15. The method of claim 12, wherein the backing film has a softening and/or melting point that is above the maximum temperature experienced by the backing film during the introducing step.

16. The method of claim 12, wherein the backing film is not a fabric and wherein the backing film is selected from the group consisting essentially of polystyrene, an acrylic polymer, polyvinyl, polyolefin, cellulose, polycarbonate, ABS, polypropylene, polyester, polyethylene, and mixtures and composites thereof.

17. The method of claim 12, wherein the backing film is a cast, continuous film and wherein the backing film is selected from the group consisting essentially of polystyrene, an acrylic polymer, polyvinyl, polyolefin, cellulose, polycarbonate, ABS, polypropylene, polyester, polyethylene, and mixtures and composites thereof.

18. The method of claim 12, wherein the backing film is an extruded, continuous film and wherein the backing film is selected from the group consisting essentially of polystyrene, an acrylic polymer, polyvinyl, polyolefin, cellulose, polycarbonate, ABS, polypropylene, polyester, polyethylene, and mixtures and composites thereof.

19. The method of claim 1, wherein the permanent adhesive is fully activated before the positioning step.

20. The method of claim 12, wherein the mold insert further comprises a second adhesive located between the permanent adhesive layer and the backing film.

21. The method of claim 12, wherein the mold insert further comprises a barrier film positioned between the flock fibers and the backing film and wherein the barrier film includes a thermally insulative material.

22. The method of claim 1, wherein the mold insert comprises a foam backing material or precursor thereof.

23. The method of claim 1, wherein the plurality of flock fibers comprise flock fibers of different colors and the color is permanently imparted to the fibers by at least one of pigment-in-polymer and dying techniques.

24. The method of claim 2, wherein the providing step comprises:
establishing a vacuum connection with the release sheet using one or more vacuum suction cups; and
transporting a mold insert film and placing the mold insert film in a forming tool by means of the vacuum connection to form the mold insert.

25. A method, comprising:
providing a non-planar, dimensionally stable three dimensional mold insert formed from a mold insert film comprising a flock layer, a backing film, and a layer of permanent adhesive bonding the flock layer to the backing film, wherein the flock layer comprises flock fibers substantially perpendicular to a surface of the backing film;
inserting the mold insert into a cavity of a mold, wherein a non-planar surface of the mold insert matches substantially a non-planar surface of the mold, thereby preventing dislodgment of the mold insert due to an introduction of a flowable resin;
introducing the flowable resin into the cavity of the mold to form a molded article comprising the mold insert and the resin, the backing film being melt compatible with and forming a melt bond with polymers in the resin; and
after the resin solidifies, ejecting the molded article from the mold.

26. The method of claim 25, wherein the mold insert comprises a carrier sheet attached to a first side of the flock layer while the backing film is bonded to an opposing second end of the flock layer and wherein the mold insert is free of a hot melt adhesive.

27. The method of claim 25, wherein the permanent adhesive is activatable, wherein the flock layer is free of acrylic, and wherein the providing step comprises:
applying a release adhesive in a desired pattern to a dimensionally stable carrier sheet;
applying a decorative medium to the release adhesive;
applying the layer of activatable adhesive to the exposed ends of the decorative medium;
contacting the backing film with the layer of activatable adhesive;
heating the layer of activatable adhesive to fully activate the layer of activatable adhesive and form an assembly; and
forming, by thermoforming, reforming, vacuum forming, and/or hydro-forming the assembly into the mold insert into a three dimensional, non-planar shape.

28. The method of claim 25, wherein the mold insert comprises a thermally insulating barrier film and a second layer of adhesive bonding the barrier film to the flock layer.

29. The method of claim 25, wherein the permanent adhesive is activatable and wherein the providing step comprises:
applying in a desired pattern the layer of activatable adhesive to the backing film; and
applying flock to the layer of activatable adhesive.

30. The method of claim 25, wherein the backing film is a high polymeric substance and not a fabric.

31. The method of claim 30, wherein the permanent adhesive is activatable, wherein the polymeric substance is a polycarbonate, and wherein the activatable adhesive is fully activated before the inserting step.

32. The method of claim 30, wherein the resin and backing film are plastics and wherein melting and softening points of the flock are no less than and a melting point of the permanent adhesive layer is greater than a maximum resin temperature in the mold.

33. The method of claim 30, wherein the resin and backing film have differing chemical compositions and wherein melting and softening points of the flock are no less than and a melting point of the permanent adhesive layer is greater than a maximum resin temperature in the mold.

34. The method of claim 25, wherein the resin is a polycarbonate and wherein melting and softening points of the flock are no less than and a melting point of the permanent adhesive layer is greater than a maximum resin temperature in the mold.

35. The method of claim 25, wherein the permanent adhesive is activatable, wherein the layer of activatable adhesive comprises an activatable permanent adhesive film and wherein the three dimensional mold insert is formed, before the inserting step, by steps comprising:
  laminating the flocked transfer sheet, the activatable permanent adhesive film, and the backing film together to form the mold insert; and
  thereafter forming the mold insert into a three dimensional shape matching at least a portion of a mold.

36. The method of claim 35, further comprising:
locating the mold insert in the mold; and
introducing the flowable resin into the mold, such that the flowable resin contacts the mold insert to form the molded article.

37. The method of claim 35, wherein a release sheet is affixed to a first surface of the flock layer and the activatable permanent adhesive film to an opposing second surface defined by the flock layer.

38. The method of claim 37, wherein, during the laminating step, the activatable permanent adhesive is fully activated.

39. The method of claim 35, wherein the activatable permanent adhesive is a thermoset adhesive selected from the group consisting of polyethylene, polyurethane, polyamide, phenolic, alkyd, amino resin, polyester, epoxide, silicone, and mixtures thereof and wherein the plurality of flock fibers are free of acrylic.

40. The method of claim 35, wherein a continuous length of the flocked transfer sheet comprises a plurality of discrete flocked regions.

41. The method of claim 35, wherein the activatable permanent adhesive film is a cast, continuous film and is selected from the group consisting of polyethylene, polyurethane, polyamide, phenolic, alkyd, amino resin, polyester, epoxide, silicone, and mixtures thereof and wherein the plurality of flock fibers are free of acrylic.

42. The method of claim 35, wherein the activatable permanent adhesive film is an extruded, continuous film and is selected from the group consisting of polyethylene, polyurethane, polyamide, phenolic, alkyd, amino resin, polyester, epoxide, silicone, and mixtures thereof and wherein the plurality of flock fibers are free of acrylic.

43. The method of claim 35, wherein the activatable permanent adhesive film is not a fabric.

44. The method of claim 35, wherein, after the laminating step, a plurality of mold inserts are located on a continuous length of the backing film and further comprising:
  cutting the backing film to provide a plurality of disconnected mold inserts.

45. The method of claim 44, wherein, after the cutting step, the mold insert comprises a flocked area surrounded at least substantially by an unflocked area of the backing film.

46. A method, comprising:
providing a mold insert comprising a plurality of flock fibers, a permanent adhesive layer, and a dimensionally stable backing film, wherein the backing film is affixed to the permanent adhesive layer, wherein the permanent adhesive layer is affixed to an opposing second surface defined by the flock fibers, wherein the mold insert is non-planar, wherein the flock fibers are free of acrylic, and wherein the permanent adhesive is selected from the group consisting of polyethylene, polyurethane, polyamide, phenolic, alkyd, amino resin, polyester, epoxide, silicone, and mixtures thereof;
positioning the mold insert in a mold, wherein the mold insert fits into an extension and/or recess in the mold, thereby preventing dislodgment of the mold insert due to an introduction of a resin; and
introducing the resin into the mold, such that a resin contacts the mold insert and the backing film is melt compatible with and forms a melt bond with polymers in the resin to form a molded article.

47. The method of claim 46, wherein the mold insert is free of a hot melt adhesive and the permanent adhesive is fully cross-linked before the positioning step.

48. A method, comprising:
providing a mold insert comprising a plurality of flock fibers, a fully activated permanent adhesive layer, and a dimensionally stable backing film, wherein the backing film is affixed to the permanent adhesive layer, wherein the permanent adhesive layer is affixed to an opposing second surface defined by the flock fibers, and wherein the mold insert is non-planar;
positioning the mold insert in a mold, wherein the mold insert fits into an extension and/or recess in the mold, thereby preventing dislodgment of the mold insert due to an introduction of a resin; and
introducing the resin into the mold, such that a resin contacts the mold insert and the backing film is melt compatible with and forms a melt bond with polymers in the resin to form a molded article, wherein a melting point of the permanent adhesive layer is greater than a temperature of the resin during the introducing step.

49. The method of claim 48, wherein the flock fibers are free of acrylic and wherein the permanent adhesive is selected from the group consisting of polyethylene, polyurethane, polyamide, phenolic, alkyd, amino resin, polyester, epoxide, silicone, and mixtures thereof.

50. A method, comprising:
providing a mold insert comprising a plurality of flock fibers, a permanent adhesive layer, and a dimensionally stable backing film, wherein the backing film is affixed to the permanent adhesive layer, wherein the permanent adhesive layer is affixed to an opposing second surface defined by the flock fibers, and wherein, the mold insert is non-planar;
positioning the mold insert in a mold, wherein the mold insert fits into an extension and/or recess in the mold, thereby preventing dislodgment of the mold insert due to an introduction of a resin; and
introducing the resin into the mold, such that a resin contacts the mold insert and the backing film is melt compatible with and forms a melt bond with polymers in the resin to form a molded article, wherein melting and softening points of the flock are no less than and a melting point of the permanent adhesive layer is greater than a maximum resin temperature in the mold during the introducing step.

51. The method of claim 48, wherein the permanent adhesive is fully activated, wherein the flock fibers are free of acrylic, and wherein the permanent adhesive is selected from the group consisting of polyethylene, polyurethane, polyamide, phenolic, alkyd, amino resin, polyester, epoxide, silicone, and mixtures thereof.

* * * * *